United States Patent
Blauvelt et al.

(10) Patent No.: US 7,095,928 B2
(45) Date of Patent: Aug. 22, 2006

(54) SURFACE-MOUNTED PHOTODETECTOR FOR AN OPTICAL WAVEGUIDE

(75) Inventors: Henry A. Blauvelt, San Marino, CA (US); David W. Vernooy, Sierra Madre, CA (US); Joel S. Paslaski, Alhambra, CA (US)

(73) Assignee: Xponent Photonics Inc, Monrovia, CA (US)

( * ) Notice: Subject to any disclaimer, the term of this patent is extended or adjusted under 35 U.S.C. 154(b) by 241 days.

(21) Appl. No.: 10/721,631

(22) Filed: Nov. 25, 2003

(65) Prior Publication Data

US 2004/0218849 A1 Nov. 4, 2004

Related U.S. Application Data

(60) Provisional application No. 60/466,799, filed on Apr. 29, 2003, provisional application No. 60/473,699, filed on May 27, 2003.

(51) Int. Cl.
*G02B 6/30* (2006.01)
(52) U.S. Cl. .......................................... 385/49; 385/92
(58) Field of Classification Search ............ 385/47–49, 385/88, 92
See application file for complete search history.

(56) References Cited

U.S. PATENT DOCUMENTS 4,750,799 A 6/1988 Kawachi et al.

(Continued)

OTHER PUBLICATIONS

International Search Report for corresponding App. No. PCT/US03/37457; mailing date Jun. 7, 2004. (4 pages).

(Continued)

*Primary Examiner*—John D. Lee
(74) *Attorney, Agent, or Firm*—David S. Alavi; Christie Parker & Hale LLP

(57) ABSTRACT

An optical apparatus comprises an optical waveguide, a bottom surface and walls formed on a first substrate and defining a detection volume with an upper opening, and a photodetector active area formed on a photodetector substrate. The bottom surface may be provided with a reflective coating. The waveguide is positioned relative to the detection volume so that light emerging from an end face of the waveguide is received within the detection volume. The detector substrate is mounted on the first substrate so as to cover the upper opening of the detection volume with the active area exposed to the detection volume. The optical waveguide may be formed on the first substrate along with the detection volume, or the optical waveguide may be formed on a separate waveguide substrate, and the waveguide substrate assembled with the first substrate.

12 Claims, 24 Drawing Sheets

U.S. PATENT DOCUMENTS

| | | | |
|---|---|---|---|
| 5,218,223 A | 6/1993 | Spaeth et al. | |
| 5,291,572 A | 3/1994 | Blonder et al. | |
| 5,344,746 A | 9/1994 | Vettiger et al. | |
| 5,488,678 A | 1/1996 | Taneya et al. | |
| 5,666,450 A | 9/1997 | Fujimura et al. | |
| 5,774,614 A | 6/1998 | Gilliland et al. | |
| 5,932,114 A | 8/1999 | Makiuchi | |
| 5,966,478 A * | 10/1999 | Marcuse et al. | 385/14 |
| 5,999,670 A | 12/1999 | Yoshimura et al. | |
| 6,108,472 A | 8/2000 | Rickman et al. | |
| 6,324,314 B1 | 11/2001 | Ukechi et al. | |
| 6,617,568 B1 | 9/2003 | Matsuda | |
| 6,885,795 B1 | 4/2005 | Hsu et al. | |
| 6,917,636 B1 | 7/2005 | Blauvelt et al. | |
| 2003/0219192 A1 | 11/2003 | Crafts et al. | |
| 2003/0235371 A1 | 12/2003 | Shimada et al. | |
| 2004/0052480 A1 | 3/2004 | Banzoni et al. | |
| 2004/0161186 A1 | 8/2004 | Crafts et al. | |
| 2004/0264913 A1 | 12/2004 | Vernooy et al. | |
| 2005/0207464 A1 | 9/2005 | Blauvelt et al. | |

OTHER PUBLICATIONS

Bazylenko et al. Fabrication of Light-Turning Mirrors in Buried-Channel silica Waveguides for Monolithic and Hybrid integration, Journal of Lightwave Technology, Jan 1997, pp. 148-153, vol. 15, No. 1.

Bouadma et al., 1.3-um GaInAsP/InO Buried-Ridge-Structure Laser and its Monolithic Integration with Photodetector Using RI Beam Etching, Journal of Lightwave Technology, May 1994, pp. 742-748. vol. 12, No. 5.

Crookes et al., Selfaligned integrated silica on silicon waveguide-photodiode interface, Electronics Letters, Jun. 9, 1994, pp. 1002-1003, vol. 30, No. 12.

Jones et al, Hybrid integration onto silicon motherboards with planar silica waveguides, IEE Proc. Optoelectron., Oct. 1996, pp. 316-321, vol. 143, No. 5.

* cited by examiner

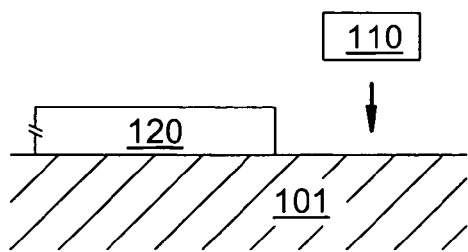
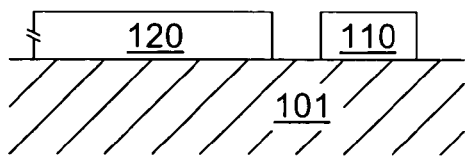
FIG. 1A    FIG. 1B
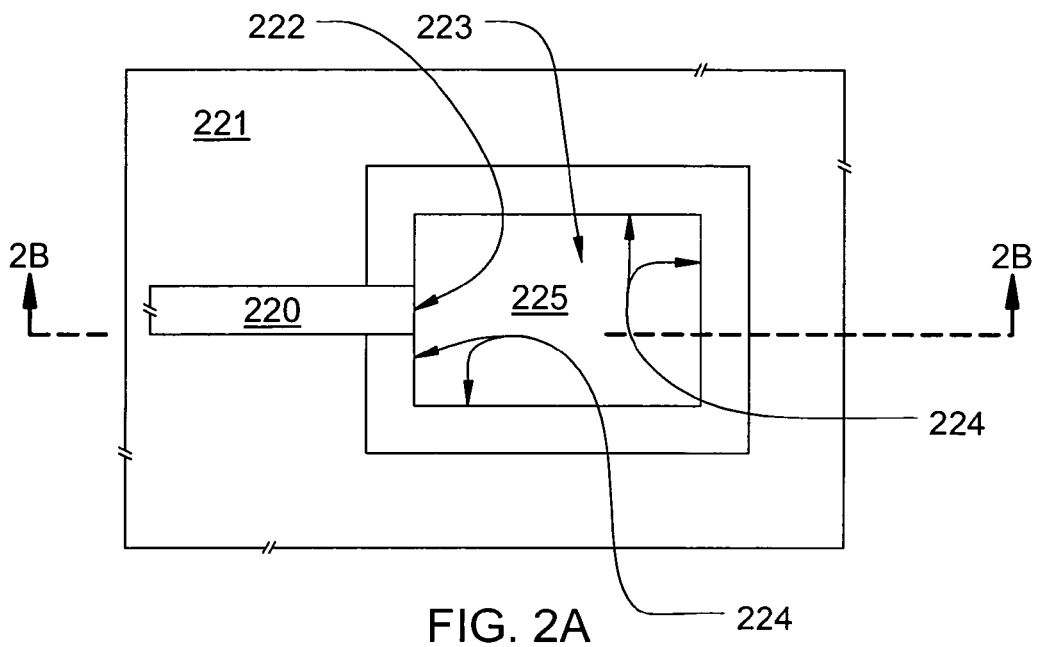
FIG. 2A
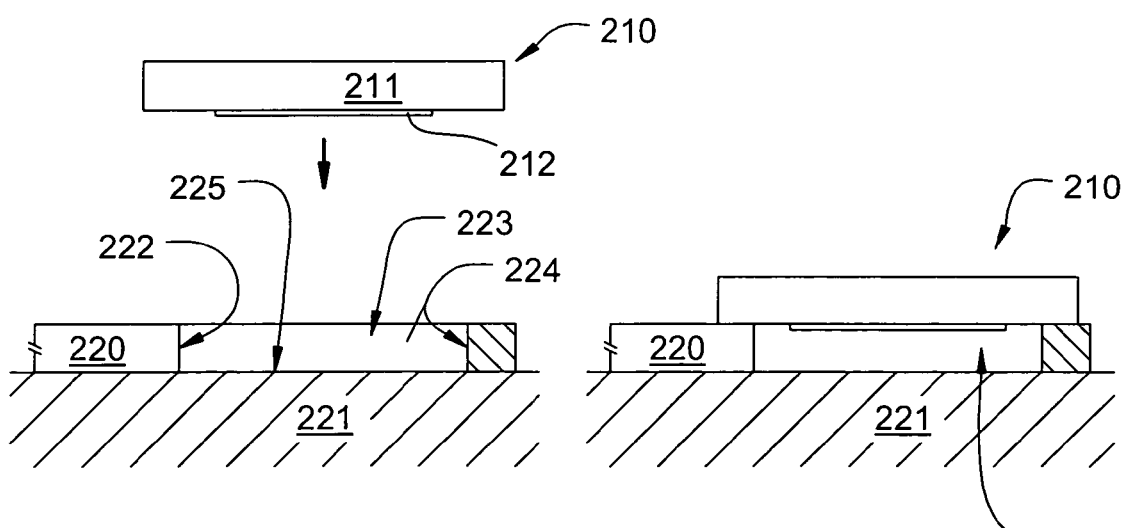
FIG. 2B    FIG. 2C

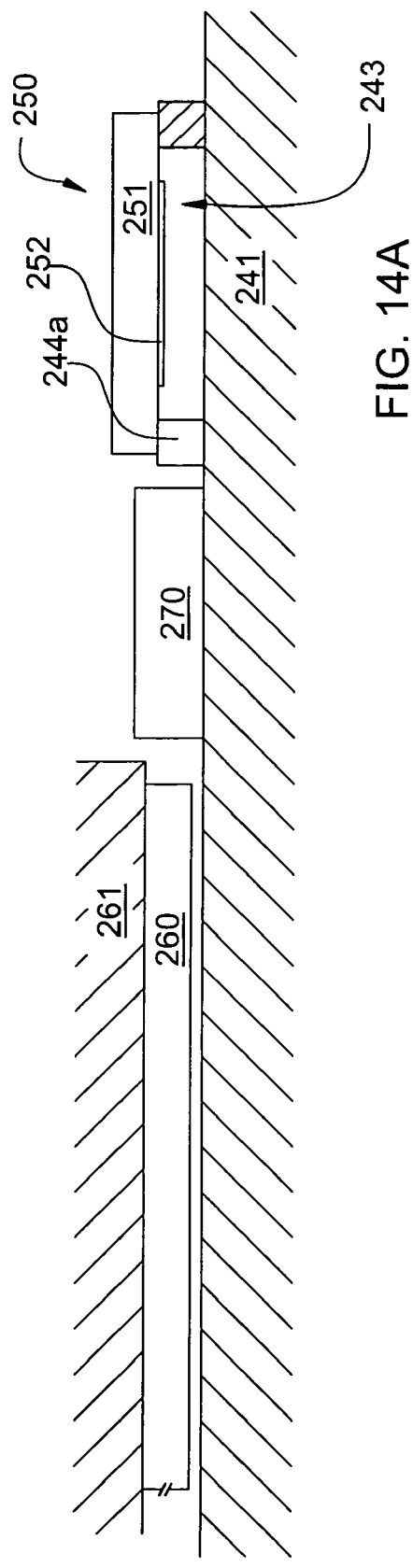
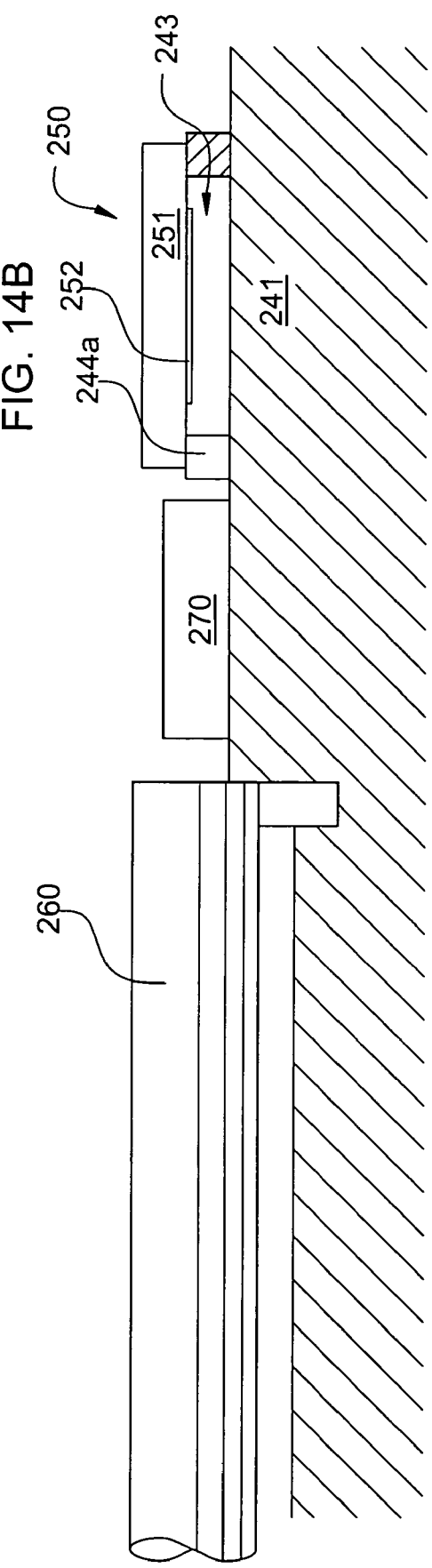
FIG. 14A
FIG. 14B

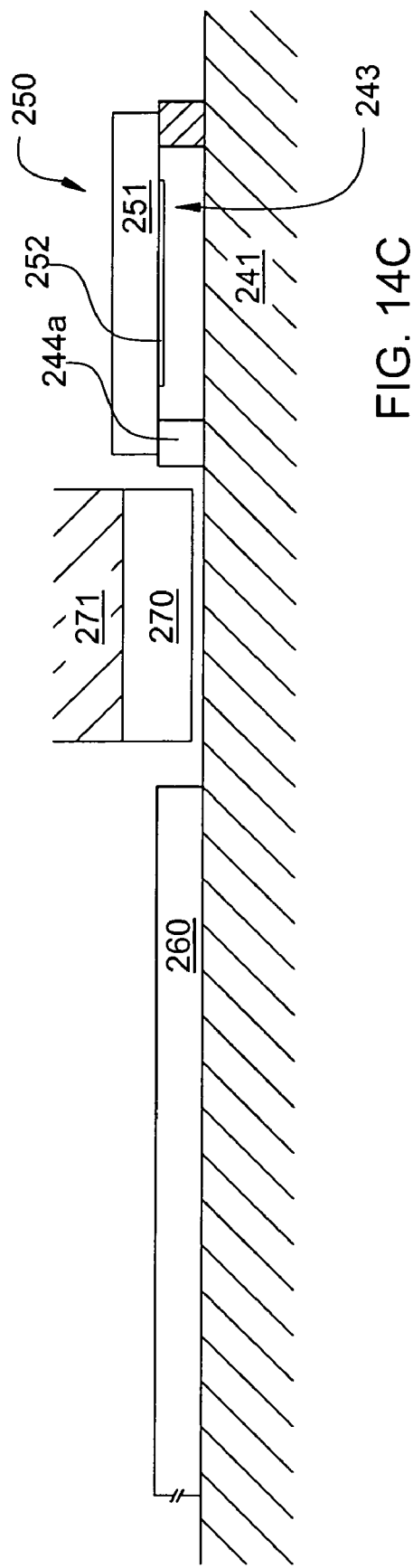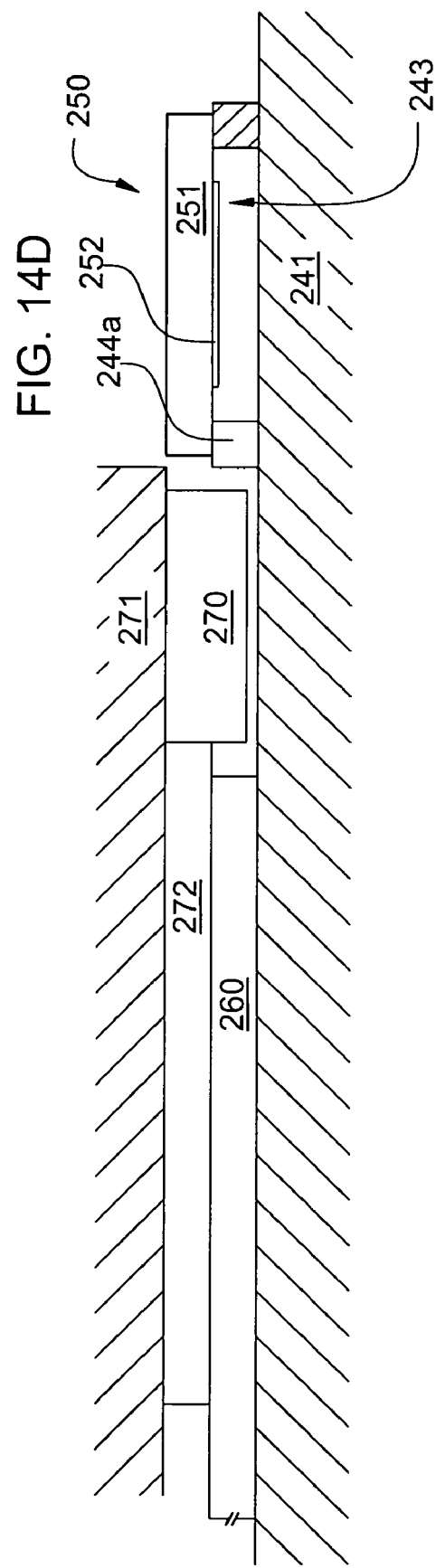

SURFACE-MOUNTED PHOTODETECTOR FOR AN OPTICAL WAVEGUIDE

This application claims benefit of prior-filed co-pending provisional App. No. 60/466,799 entitled "Low-profile-core and thin-core optical waveguides and methods of fabrication and use thereof" filed Apr. 29, 2003 in the names of David W. Vernooy, Joel S. Paslaski, and Guido Hunziker, said provisional application being hereby incorporated by reference as if fully set forth herein. This application claims benefit of prior-filed co-pending provisional App. No. 60/473,699 entitled "Surface-mounted photodiode for an optical waveguide" filed May 27, 2003 in the names of Henry A. Blauvelt, David W. Vernooy, and Joel S. Paslaski, said provisional application being hereby incorporated by reference as if fully set forth herein.

BACKGROUND

The field of the present invention relates to semiconductor photodetectors. In particular, surface-mounted photodetector is described herein for detecting light emerging from a planar waveguide.

FIGS. 1A and 1B illustrate a generic configuration including a planar waveguide 120 on a waveguide substrate 101. A surface-mounted photodetector 110 is placed on the waveguide substrate 101 (either directly, or on alignment/support members on the waveguide substrate) for detecting optical power propagating from an output face of waveguide 120. Reasons for using a photodetector in such circumstances are numerous. For example, the optical power propagating through waveguide 120 may comprise an optical telecommunications signal modulated at high data rates (10 or more Gbits/sec, for example), and a high-speed photodetector 110 may be employed as a receiver for converting the optical signal into an electronic signal. In another example, the optical power propagating through waveguide 120 may comprise a portion of the output of a semiconductor laser or other light source split from the main optical output for monitoring purposes. The resulting signal from the photodetector may be used for signal normalization, as a feedback control signal for stabilizing the operation of the light source, and/or for other purposes. In this type of application a high-speed photodetector may or may not be required. Many other circumstances may be envisioned wherein detection of optical power propagating through an optical waveguide or an optical fiber may be useful.

Silicon is a commonly-used planar waveguide substrate, typically provided with a silica buffer layer and one or more silica-based planar waveguides fabricated on the silica buffer layer (so-called Planar Waveguide Circuits, or PLCs). It is often the case (in telecommunications devices) that the wavelength of the optical power carried by waveguide 120 lies in the 1.2 µm to 1.6 µm region, for which silicon-based photodetectors may not be suitable. Photodetectors based on III–V semiconductors are suitable for this wavelength region, but the materials are not compatible for fabrication of the photodetector directly on a silicon or silica surface. Even if waveguide substrate and detector materials are compatible, it may nevertheless be desirable for providing the semiconductor photodetector as a separate component for later assembly for other reasons (incompatible processing steps, design flexibility, customization of waveguide and/or photodetector, and so forth). A separately fabricated semiconductor photodetector 110 (III–V or otherwise) is therefore often assembled onto substrate 101 (silicon or otherwise) and aligned for receiving and detecting at least a portion of the optical power propagating through waveguide 120. The subject matter of the present disclosure addresses suitable fabrication and/or adaptation of an optical waveguide, waveguide substrate, and/or semiconductor photodetector 110 for such assembly.

SUMMARY

An optical apparatus comprises an optical waveguide, a bottom surface and walls formed on a first substrate and defining a detection volume with an upper opening, and a photodetector active area formed on a photodetector substrate. The bottom surface may be provided with a reflective coating. The waveguide is positioned relative to the detection volume so that at least a portion of light emerging from an end face of the waveguide is received within the detection volume. The detector substrate is mounted on the first substrate so as to cover at least a portion of the upper opening of the detection volume with at least a portion of the active area exposed to the detection volume. The optical waveguide may be formed on the first substrate along with the detection volume, or the optical waveguide may be formed on a separate waveguide substrate, and the waveguide substrate mounted on the first substrate.

The waveguide and detection volume may be formed using a common set of materials or may be formed using distinct sets of materials. If formed on a common substrate, the waveguide and detection volume may be formed using a common material processing sequence, or the waveguide and detection volume may be formed using successive material processing sequences. The photodetector may be mounted on the detection volume so as to seal the detection volume, or the detection volume may be provided with open passages to admit embedding material to fill the detection volume.

Objects and advantages pertaining to surface-mounted photodetectors may become apparent upon referring to the disclosed exemplary embodiments as illustrated in the drawings and disclosed in the following written description and/or claims.

BRIEF DESCRIPTION OF THE DRAWINGS

FIGS. 1A–1B are schematic side views of a photodetector mounted on a planar waveguide substrate.

FIG. 2A is a plan view of a waveguide and a detection volume. FIGS. 2B–2C are side views.

FIGS. 14A–14D are side views of a laser, detection volume, and photodetector.

Figure 2D:
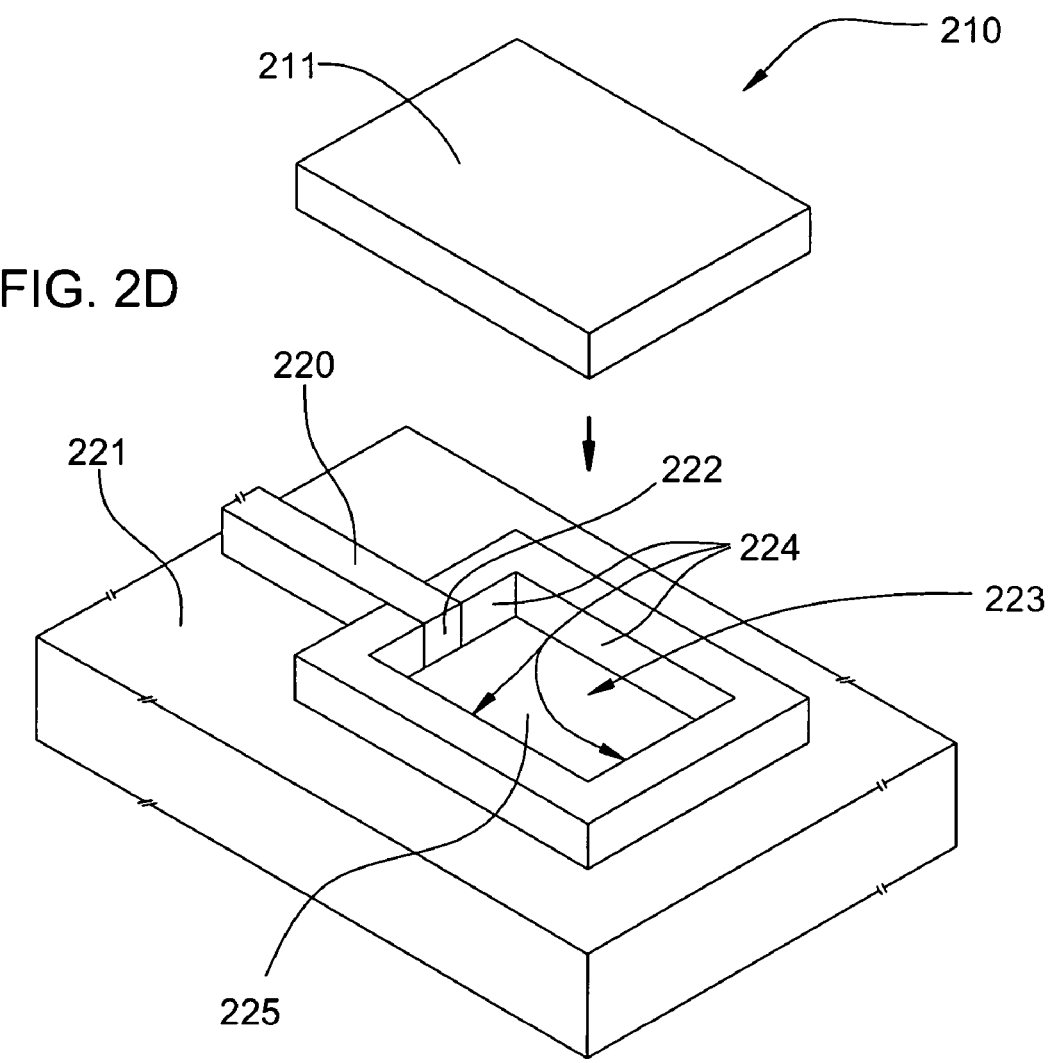
FIG. 2D is an isometric view, of a photodetector positioned over the detection volume.

The embodiments shown in the Figures are exemplary, and should not be construed as limiting the scope of the present disclosure and/or appended claims. It should be noted that the relative sizes and/or proportions of structures and features shown in the Figures may in some instances be distorted to facilitate illustration of the disclosed exemplary embodiments.

DETAILED DESCRIPTION OF EMBODIMENTS

FIGS. 2A–2D illustrate an exemplary embodiment of a surface-mounted photodetector 210 assembled with an optical planar waveguide 220 on a waveguide substrate 221. Waveguide 220 may be a planar waveguide of any suitable type formed from any suitable materials (as set forth hereinabove), and terminates at an end face 222. Light propagating along waveguide 220 exits the waveguide through end face 222 and proceeds to diverge to an extent determined by the wavelength and transverse mode size at the end face. The divergence of the light exiting the waveguide may differ in the horizontal (i.e., lateral) and vertical directions, with the vertical divergence often (but not always) exceeding the lateral divergence. A bottom surface 225 and walls 224 are formed on substrate 221 beyond end face 222 and substantially define a detection volume 223 and an upper opening thereof. The walls 224 may also be referred to as one or more inner faces of the detection volume.

Photodetector 210 is formed on a separate photodetector substrate 211, and includes an active area 212 typically comprising one or more of: n-type semiconductor layer(s); p-type semi-conductor layer(s); intrinsic semiconductor layer(s); oxide and/or other dielectric layer(s); and/or contact layer(s) comprising metal(s) and/or semiconductor material(s). Photodetector 210 may be configured in any suitable fashion, and may be operated in any suitable mode (photoconductive, photovoltaic, and so forth) over any suitable wavelength range. For detecting light emerging from end face 222 of waveguide 220, substrate 211 is flipped and surface-mounted on substrate 221 over the detection volume 223 with at least a portion of active area 212 exposed to the detection volume. Substrate 211 is laterally and longitudinally positioned so that at least a portion of the active area 212 is positioned over at least a portion of the upper opening of detection volume 223. Electrical connections to the photodetector 210 may be made directly to photodetector substrate 211 and/or may be made through mating electrical contact(s) on waveguide substrate 221. If multiple electrical connections are made via contacts on waveguide substrate 221, the corresponding contacts on the photodetector substrate 211 may be co-sided to facilitate formation of the electrical connections by assembly of substrates 221 and 211. The so-called "flip-chip" mounting of the photodetector 210 over the detection volume may in some instances serve to reduce detection of stray light, since stray light might typically have to propagate through substrate 211 to reach active area 212.

Figure 3:
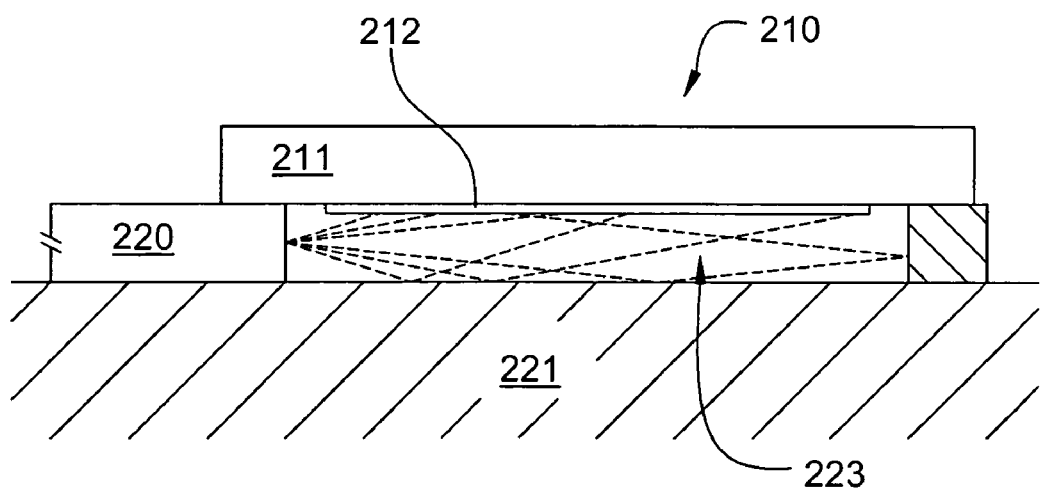
FIG. 3 is a side view of a waveguide, detection volume, and photodetector.
Figure 8A:
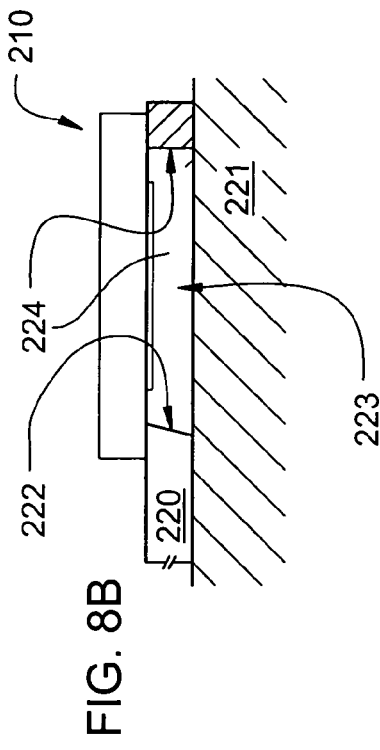
FIGS. 8A–8B are side views of an optical waveguides and corresponding detection volumes.
Figure 8B:
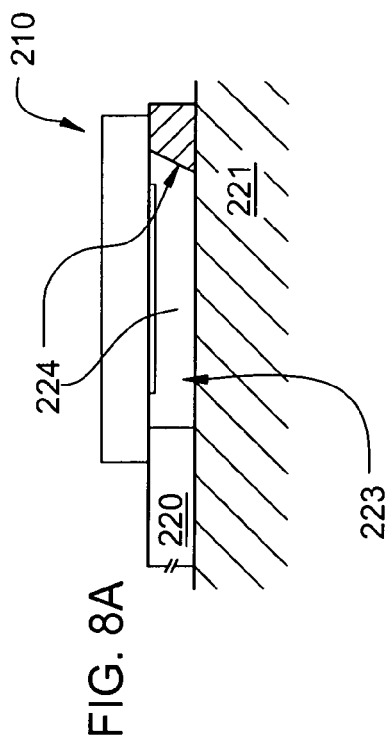

General operation of the photodetector 210 surface-mounted on substrate 221 with waveguide 220 is illustrated in FIG. 3. Light emerging from waveguide 220 through end face 222 and into detection volume 223 diverges in both vertical and horizontal directions according to the mode size at end face 222 and the wavelength. Portions of the emergent light that diverge upward may reach photodetector 210 directly. Portions of the emergent light that diverge downward are reflected (at fairly large incident angles) from the bottom surface 225 of detection volume 223, and may then reach photodetector 210. Typically, a majority of the light reaching the photodetector arrives via one of these two paths. Additional light may reach photodetector 210 after one or more reflections from one of the walls 224, with or without reflecting from the bottom surface 225. Some fraction of the emergent light may be lost due to absorption, scattering, transmission, and/or missing the active area 212 of the photodetector. A portion of the emergent light may reenter waveguide 220 through end face 222 after one or more reflections from walls 224 and/or bottom surface 225. End face 222 of waveguide 220 may be substantially vertical (i.e., substantially perpendicular to substrate 221), or may be tilted downward a few degrees to as much as about 10° (as shown in FIG. 8B). Such a downward tilt results in upward refraction of the emergent light by a few degrees toward photodetector 210, which may in turn enhance its collection efficiency. Portions (at least) or substantially all of the bottom surface 225 and the walls 224 of detection volume 223 may be made reflective for one or more wavelengths to be transmitted through end face 222 from waveguide 220, by depositing or otherwise forming suitable reflective coating(s). The index contrast between the detection volume and the bottom surface 225 (without any coating) may provide sufficient reflectivity, and may in some cases may be solely relied on to direct a portion of the light emerging from waveguide 220 onto photodetector 210.

The general structure and operation of waveguide 220 and photodetector 210 may be adapted according to constraints and/or requirements imposed by one or more of: optical performance; mechanical arrangement; materials; manufacturing; cost; and so on. For example, alignment tolerance for positioning photodiode 210 on substrate 221 relative to waveguide 220 and end face 222 thereof depends on the size of the active area 212 relative to the size of detection volume 223 and the divergence of the optical mode emerging from the end face 222. For low speed applications, or for applications wherein detection efficiency is at a premium, an active area 212 sufficiently large to substantially cover the detection volume 223 may be employed. A large active area (a few hundred microns across) relaxes the position tolerance of the photodetector relative to the waveguide end face and detection volume, and ensures that a higher fraction of photons reaching the photodetector actually strike the active area and may therefore be detected (i.e., increased collection efficiency). The large active area requires a greater area of waveguide substrate 221 to be occupied by the photodetector, and also results in slower photodetector response (on the order of a GHz).

If faster photodetector response is desired (greater than about 10 GHz, for example), an active area on the order of a few tens of microns across is typically employed. Use of a photodetector of this size either reduces the collection efficiency, and/or requires tighter placement tolerances over a detection volume of correspondingly smaller size (several tens of microns across) to maintain collection efficiency.

Optical waveguide 220 may be configured so as to yield suitable divergence of optical modes emerging from the end face 222. Increased divergence in the vertical direction may result in increased collection efficiency for a given active area size, and/or may enable use of a smaller detection volume and/or active area while maintaining collection efficiency. Such increased divergence typically implies a smaller, more well-confined optical mode supported by waveguide 220, which in turn may enable tighter bends in the waveguide and overall decrease in the size of an assembled, multi-component optical device on substrate 221 (that includes the photodetector 210 and waveguide 220). Decreased divergence in the lateral direction may increase collection efficiency for a given active area size, and/or may enable use of a smaller detection volume and/or active area while maintaining collection efficiency.

Figure 9:
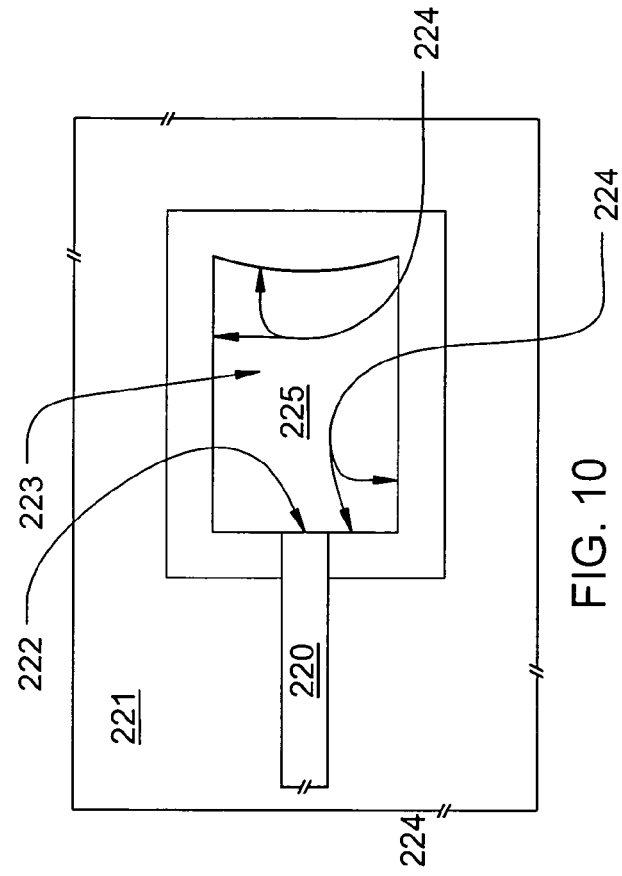
FIG. 9 is a plan view of an optical waveguide and detection volume.
Figure 10:
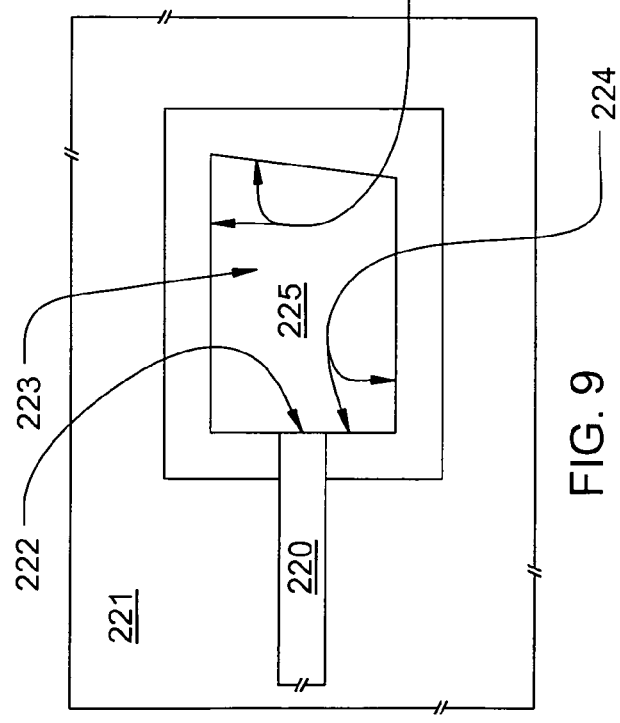
FIG. 10 is a plan view of an optical waveguide and detection volume.

In another example, reducing optical feedback reentering waveguide 220 through end face 222 may be of primary importance. Such feedback may be reduced in a variety of ways. Enlarging the horizontal extent (primarily the longitudinal extent) of the detection volume 223 correspondingly reduces the fraction of emergent light that may return to end face 222 without first reaching the photodiode or being otherwise lost. This enlargement comes at the expense of decreased collection efficiency, larger photodetector active area, and/or slower response. The one or more of walls 224 may be adapted to reduce such feedback, for example by providing wall(s) that is(are) tilted slightly away from vertical. An upward tilt of a wall 224, as in FIG. 8A for example, may also serve to increase the fraction of emergent light that reaches the photodetector, in addition to reducing the fraction that reenters waveguide 220. Providing a lateral tilt (FIG. 9) and/or a convex surface (FIG. 10) for the wall 224 opposite waveguide end face 222 may also serve to reduce optical feedback. In many cases, however, optical feedback into waveguide 220 may not be a significant issue, due to the (typically) large divergence of the beam exiting the waveguide and the longitudinal extent of the detection volume (often a hundred microns or more).

Reflective coating(s) may be employed on the bottom surface 225 (and on inner face 224 as well, if needed, desired, and/or not easily avoided) of detection volume 223 and may be of any suitable type. Metal coatings, having reflectivity relatively independent of wavelength, polarization, and/or angle of incidence, are well-suited for coating the detection volume. A gold thin film may be particularly suitable for providing a reflective coating on a semiconductor or semiconductor-based planar waveguide substrate. Other metal or dielectric coatings may be employed, and may be suitably chosen/configured based on an intended detection wavelength range. A metal reflective coating for detection volume 223 may also serve as an electrical contact for the photodetector once it is surface-mounted onto substrate 221. Waveguide end face 222 should be kept substantially free of any reflective coating applied to the detection volume 223. Reflective coating(s) may be applied to substantially all or only to portions of bottom surface 225 and walls 224. Collection efficiency for light emerging from waveguide 220 is typically enhanced by increasing the fraction of the bottom surface and inner face thus coated. In addition to suppressing optical feedback into the waveguide and/or increasing the fraction of the emergent light reaching the photodetector, an upwardly tilted wall 224 (as shown in FIG. 8A) facilitates deposition/formation of reflective coating layer(s) thereon. Reflective coating layers may also be deposited/formed on a substantially vertical walls 224, sometimes requiring a more complex material processing sequence. A suitably tilted wall 224 may be formed using any of a variety of suitable spatially selective material processing technique(s). Formation of reflective coating layer(s) may impose a lower limit on the size of the detection volume 223. Providing such layers within a detection volume less than several tens of microns across may be difficult, so it may be desirable to employ a detection volume at least this large, and in some cases up to a few hundred microns in horizontal extent. In instances wherein a smaller detection volume may be desirable or necessary (for example, for providing enhanced collection efficiency for a high-speed small-active-area photodetector) correspondingly more complex or more sophisticated spatially selective material processing techniques may be employed for providing reflective coating layer(s) within a detection volume less than several tens of microns across.

The walls 224 defining the detection volume 223 may be provided in a variety of opto-mechanical configurations, and the particular configuration may depend on the manner in which waveguide 220 is formed on substrate 221, on the various materials to be employed, and/or on the overall desired mechanical configuration for the assembled waveguide and photodetector. Several exemplary configurations are shown in FIGS. 4A–4H, 5A–5H, 6A–6H, and 7A–7H, and any suitable set of spatially selective material processing techniques may be brought to bear for forming the disclosed embodiments and/or equivalents thereof. FIGS. 4A–4H show waveguide 220 as a ridge waveguide protruding from substrate 221, with a protruding ring 423 (or partial ring) formed at the end of waveguide 220 forming walls 224 defining the detection volume 223. In FIGS. 5A–5H, the detection volume is formed as a recessed area within a substantially flat slab of material 523 on substrate 221, with a protruding ridge waveguide 220 conveying light through an edge of the slab. In FIGS. 6A–6H, waveguide 220 is a so-called buried waveguide within a slab of optical cladding material 621 on substrate 221, with a portion of the edge of the slab forming end face 222. A protruding ring 623 (or partial ring) formed on substrate 221 adjacent the edge of the slab (at end face 222) forms the walls 224 defining the detection volume 223. In FIGS. 7A–7H, waveguide 220 is buried within a slab 721 of optical cladding material on substrate 221, while the detection volume 223 is formed as a recessed area within adjacent material slab 723 on substrate 221. In each of these examples, material(s) used to form waveguide 220 and material(s) used to form the detection volume 223 may be the same, or may differ. In each of these examples, a photodetector 210 is mounted over the detection volume 223 with the active area 212 exposed to the volume. A collected fraction of the light emerging from the end face 222 of waveguide 220 reaches active area 212 of photodetector 210 (directly or after one or more reflections from the bottom surface and/or walls of the detection volume 223; substantially as shown in FIG. 3).

Waveguide 220 and walls 224 (and bottom surface 225) may be formed on substrate 221 using spatially selective material processing techniques. Such techniques may be implemented on a wafer scale for concurrent fabrication of multiple waveguide/detection volume pairs. Each such pair (a waveguide and corresponding detection volume) may end up on a separate waveguide substrate 221 upon division of a substrate wafer after processing, or multiple pairs (each including a waveguide and a corresponding detection volume) may end up on individual waveguide substrates 221 after division of the wafer, if multi-component optical devices (including multiple photodetectors) are being manufactured.

Figure 4A:
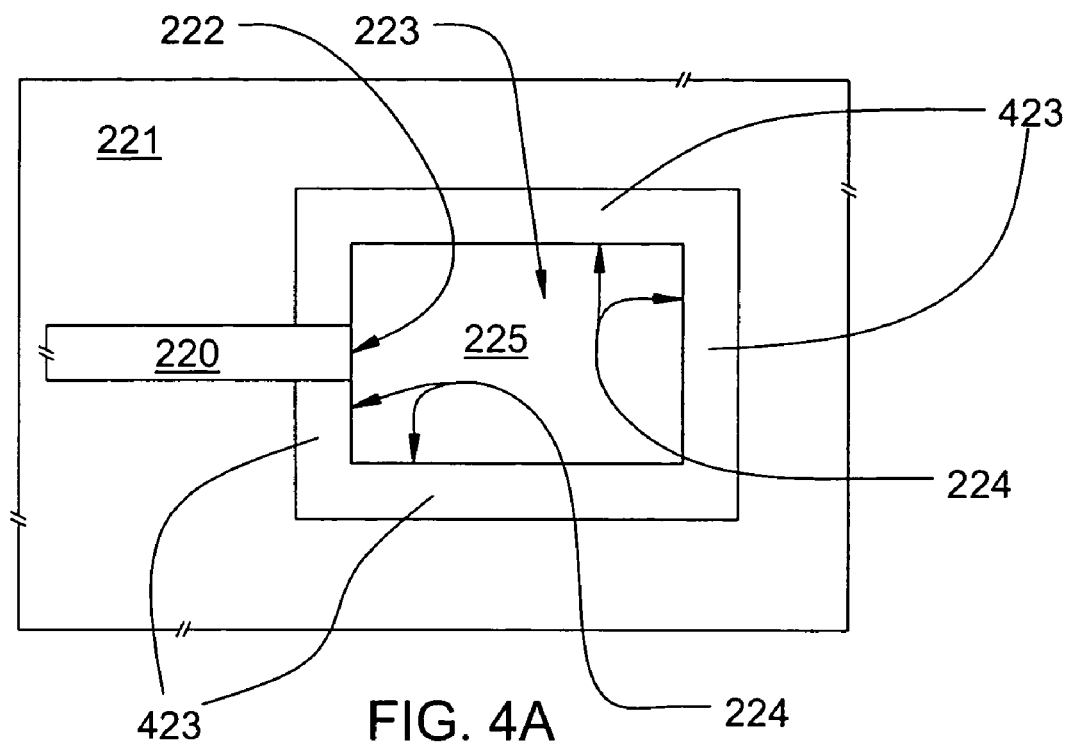
FIGS. 4A–4H are plan and isometric views of a waveguide and detection volume.
Figure 4B:
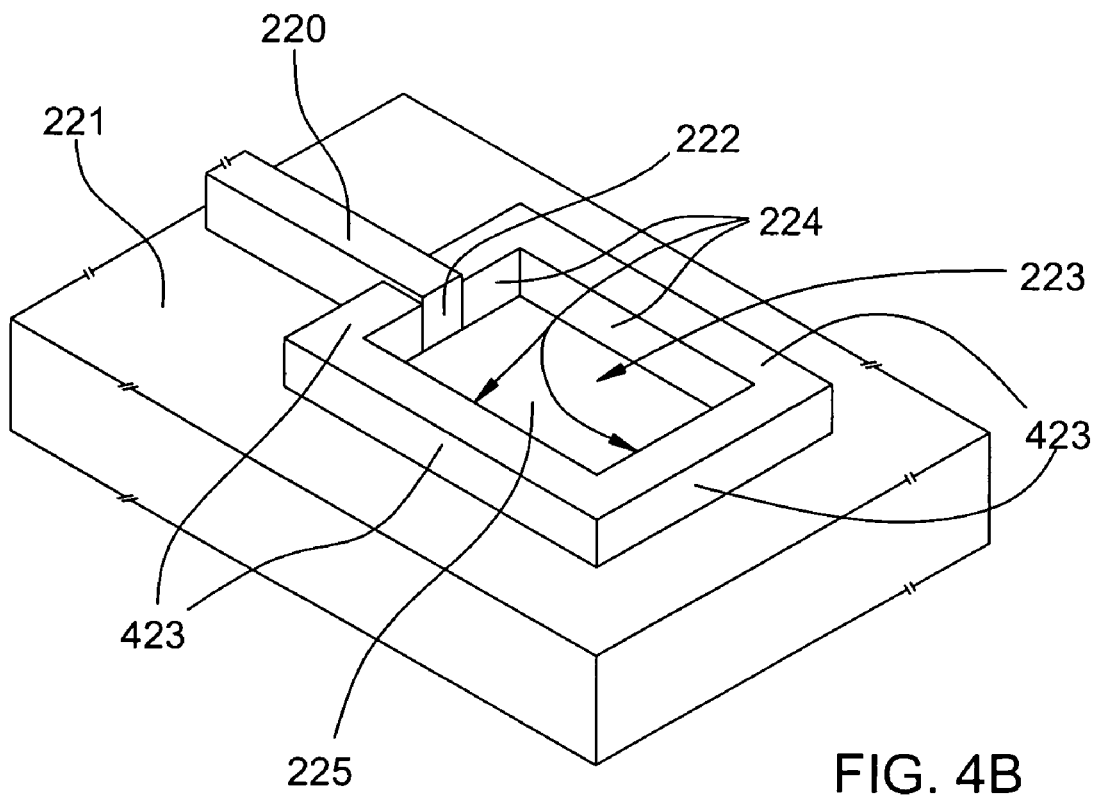
Figure 4C:
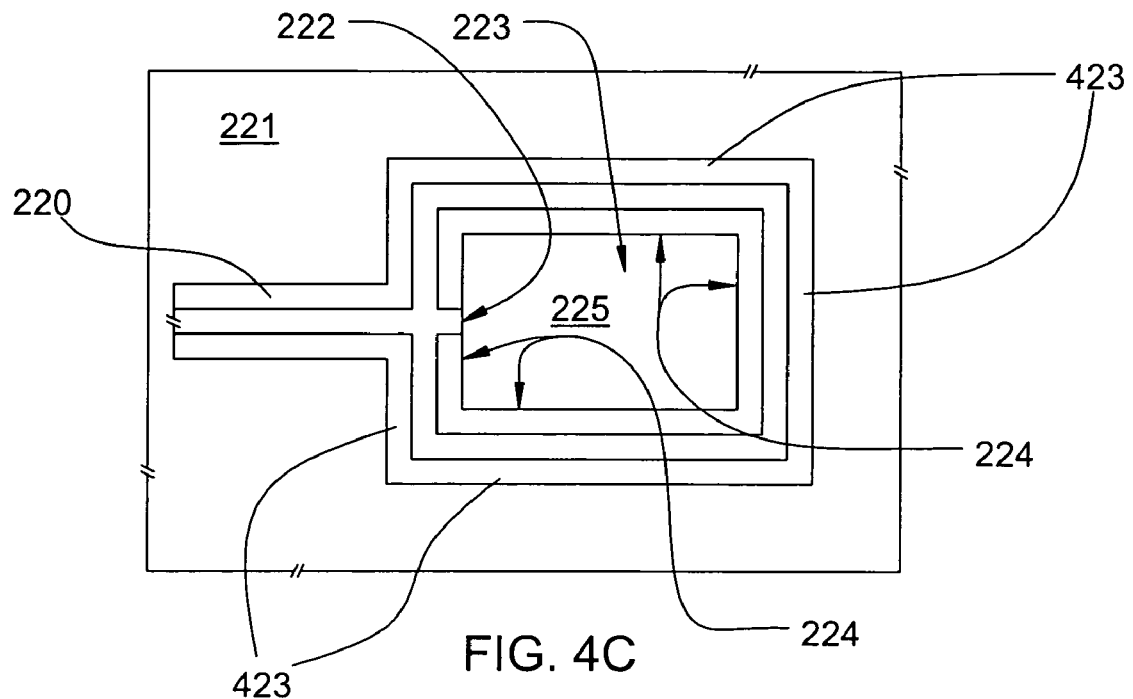
Figure 4D:
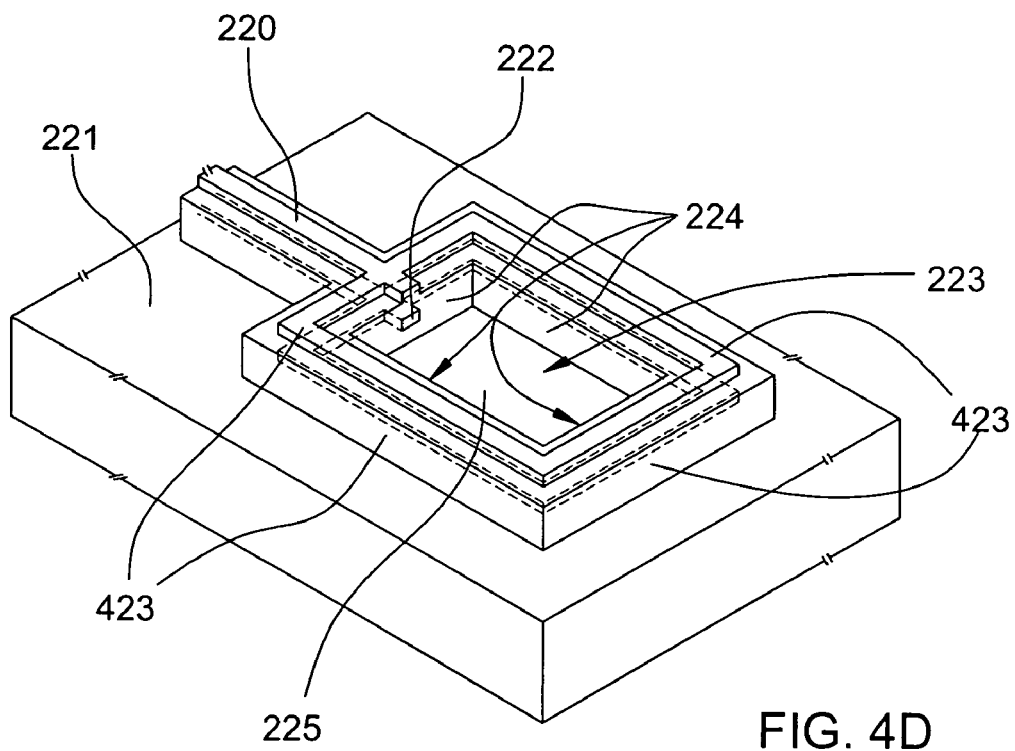
Figure 4E:
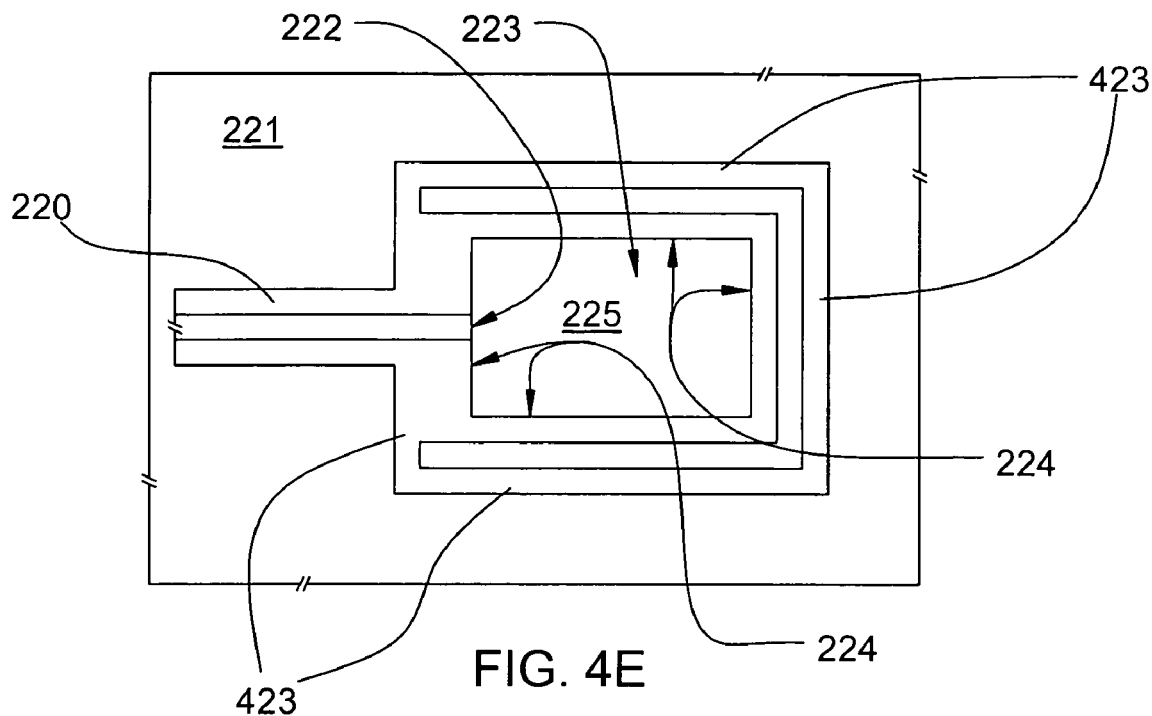
Figure 4F:
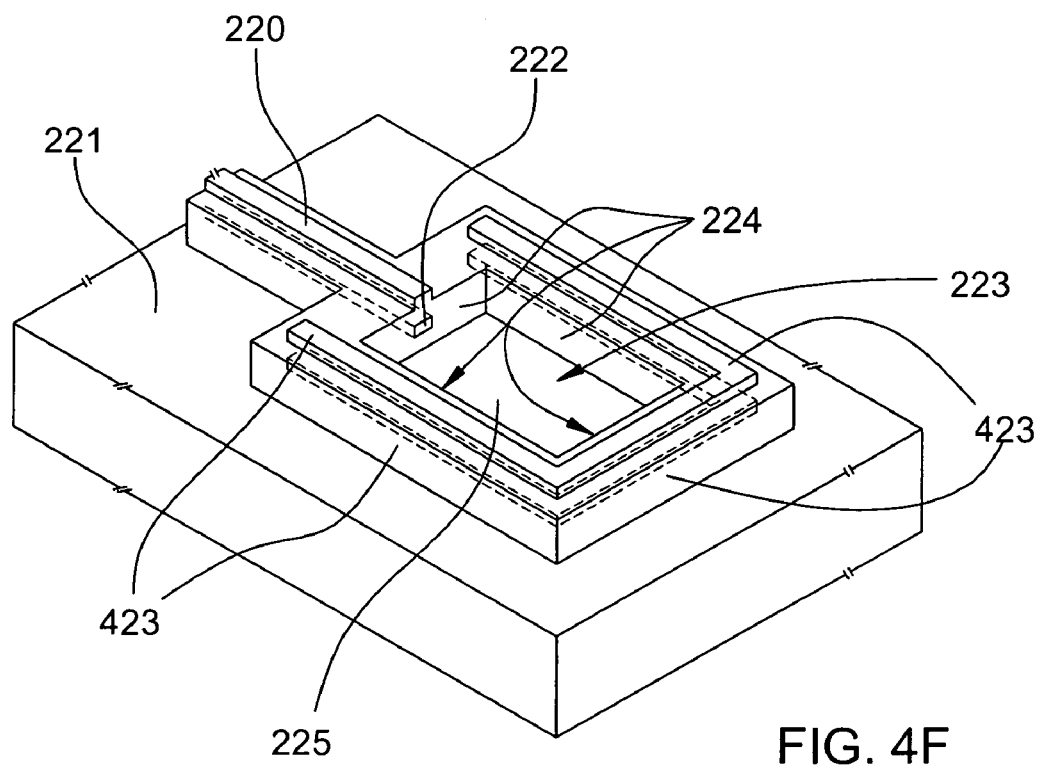
Figure 4G:
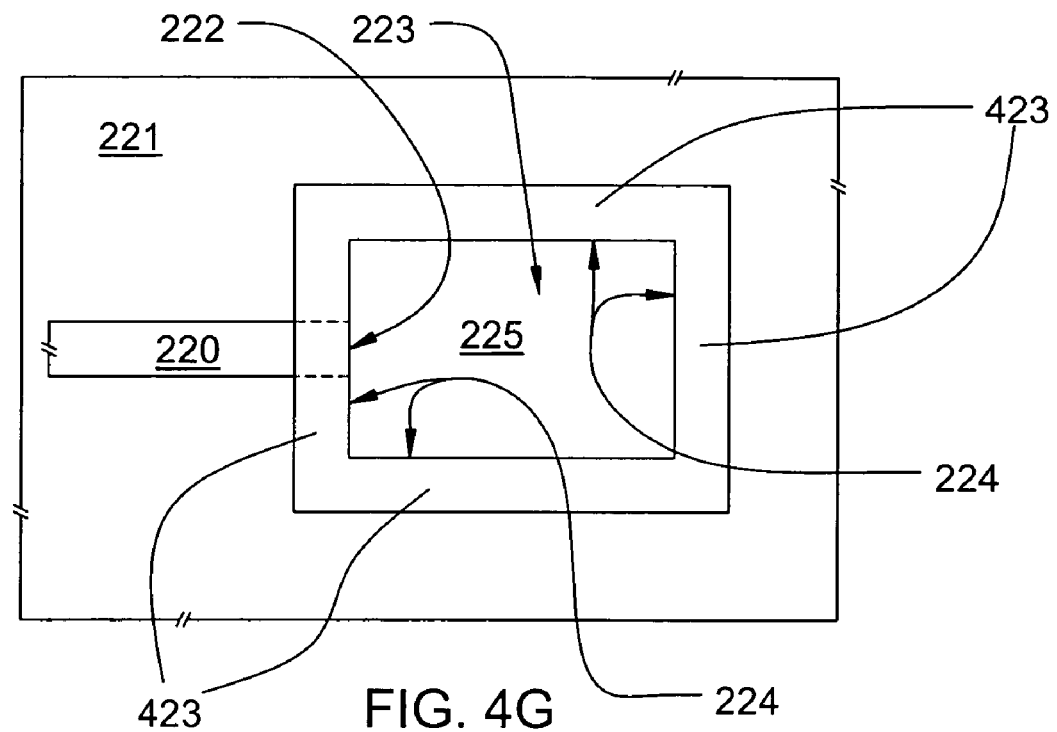
Figure 4H:
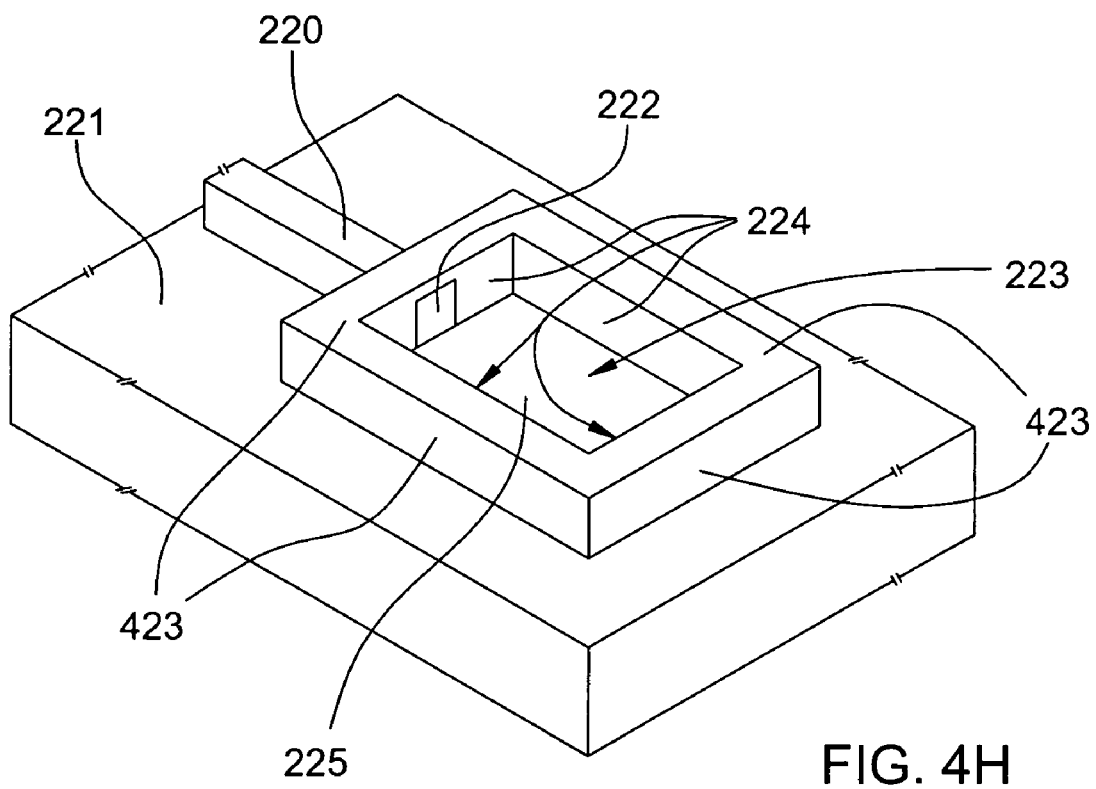

If the same materials, or overlapping/compatible sets of materials, are employed for forming both waveguide 220 and walls 224, it may be advantageous to form these structures concurrently using a common material processing sequence. For example, in FIGS. 4A–4F, protruding ring 423 may be formed from the same material(s) that form the cladding of waveguide 220, and in some instances may also include material(s) used to form the core of waveguide 220 (as in FIGS. 4C–4F). If subsequent surface-mounting of the photodetector 210 requires a substantially flat mounting surface (i.e., substantially flat substantially co-planar upper surfaces of the end of waveguide 220 and ring 423), inclusion of waveguide core material(s) within ring 423 may facilitate this (since the presence of the core typically results in corresponding raised areas of the cladding upper surface; as in FIGS. 4C–4F). The presence of waveguide core material in the ring 423 may result in optical loss where the ring core material lies near or adjacent to the waveguide core (FIGS. 4C–4D). The need for a single contiguous photodetector mounting surface (for substantially sealing the detection volume upon mounting of photodetector 210, for example, or for other purposes) may be weighed against this optical loss, and an operationally acceptable compromise design arrived at for a given scenario. In the example of FIGS. 4E–4F, gaps are present in the core material near the end of waveguide 220, yielding substantially flat substantially coplanar non-contiguous photodetector mounting surfaces, but without necessarily resulting in sealing of the detection volume upon mounting of the photodetector 210. If the gaps are sufficiently narrow and/or shallow, solder or adhesive used to secure the photodetector substrate over the detection volume may fill the gaps. If the core material within waveguide 220 is sufficiently thin, and/or if the flatness requirement for the photodetector mounting surface is sufficiently lax, it may be appropriate to avoid any inclusion of waveguide core material within protruding ring 423 (as in FIGS. 4A–4B, without a material boundary between waveguide 220 and ring 423).

Figure 5A:
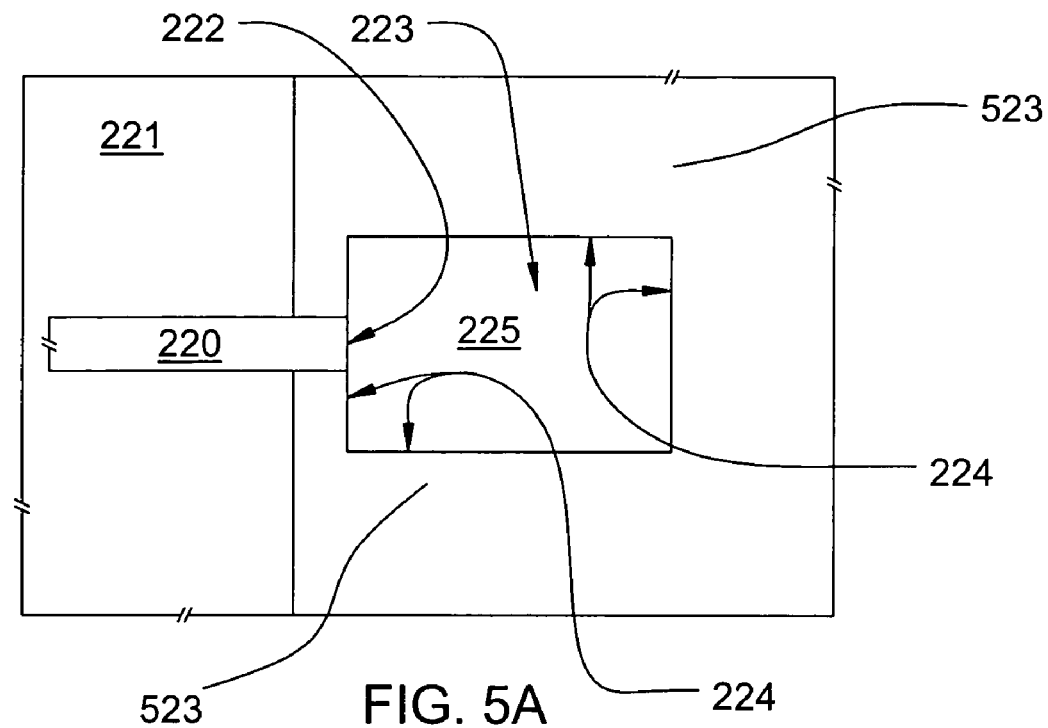
FIGS. 5A–5H are plan and isometric views of a waveguide and detection volume.
Figure 5B:
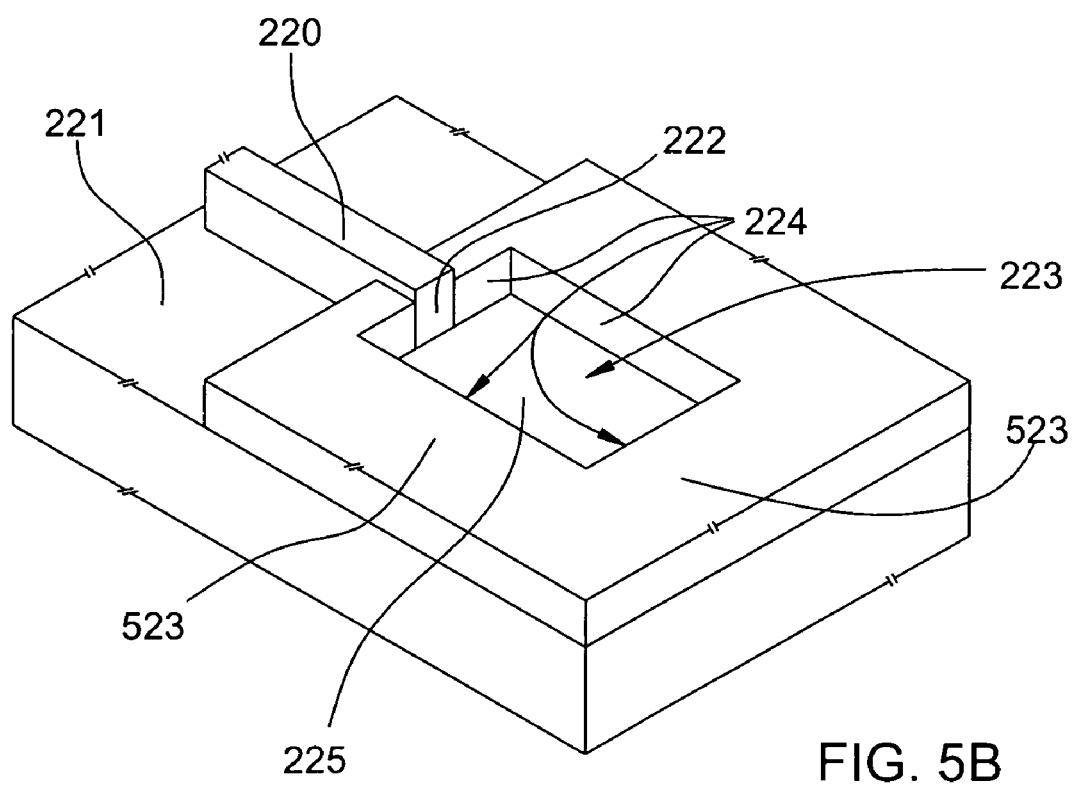
Figure 5C:
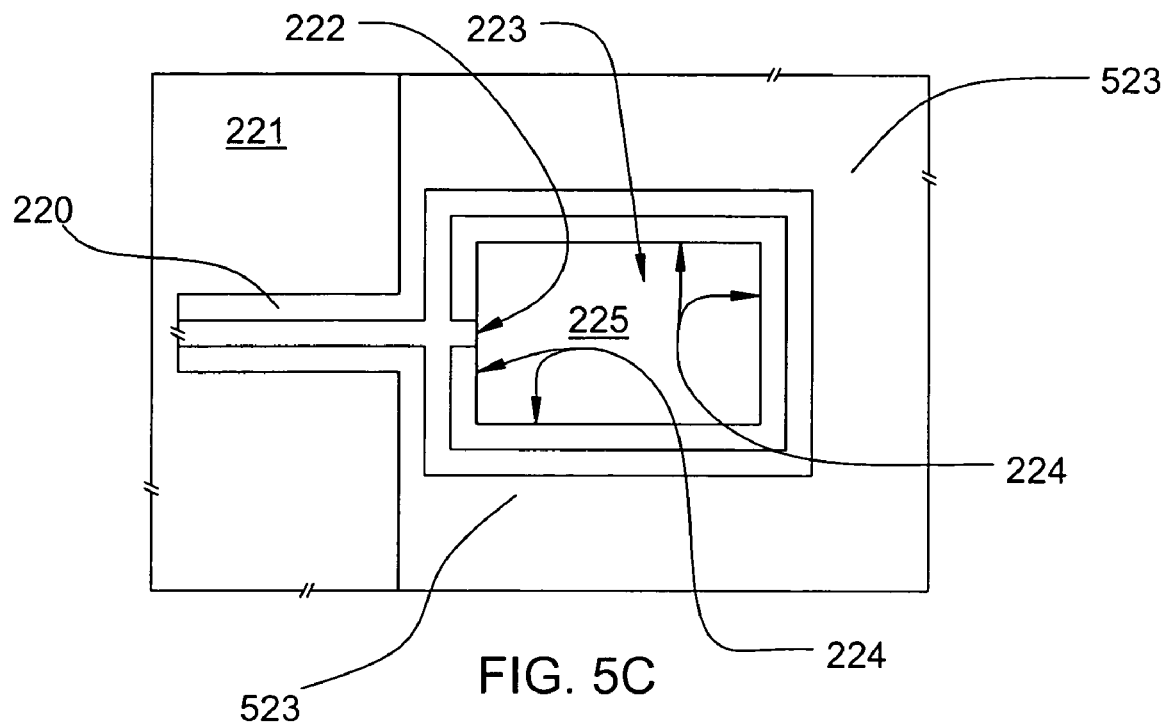
Figure 5D:
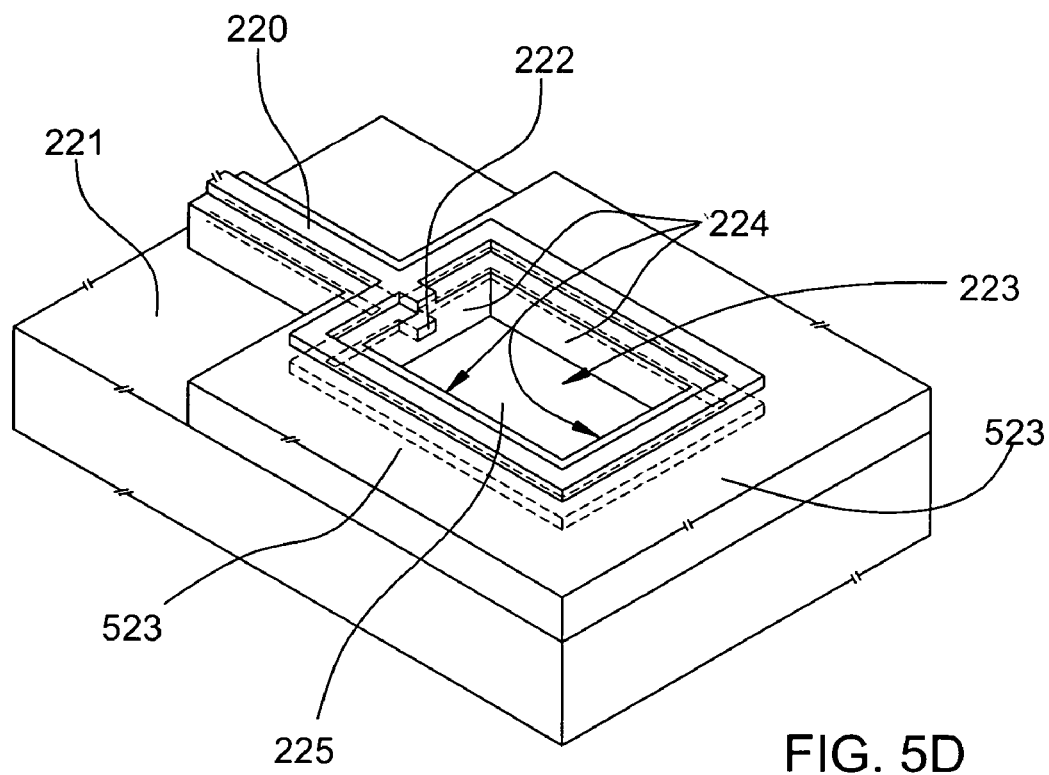
Figure 5E:
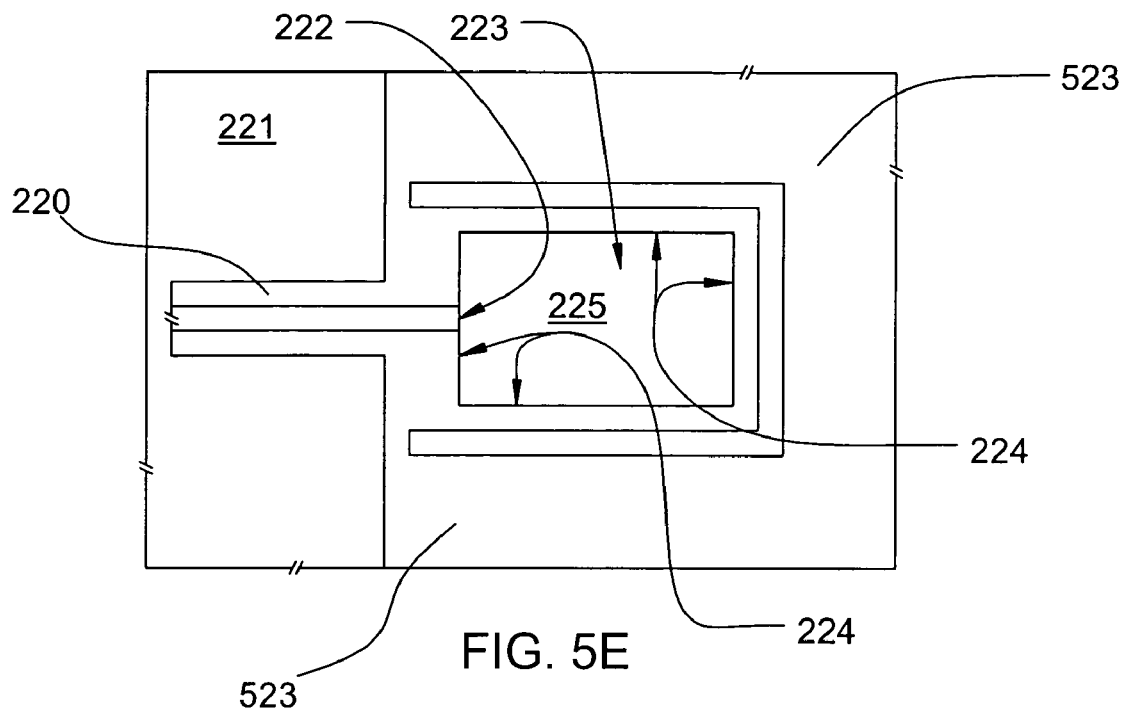
Figure 5F:
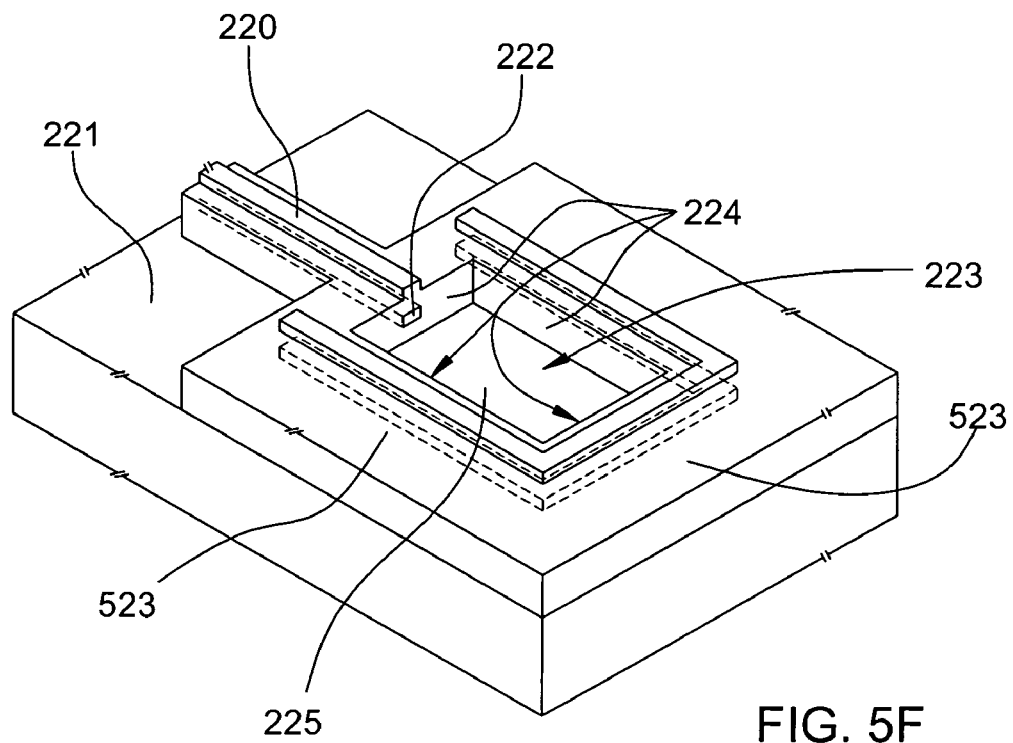
Figure 5G:
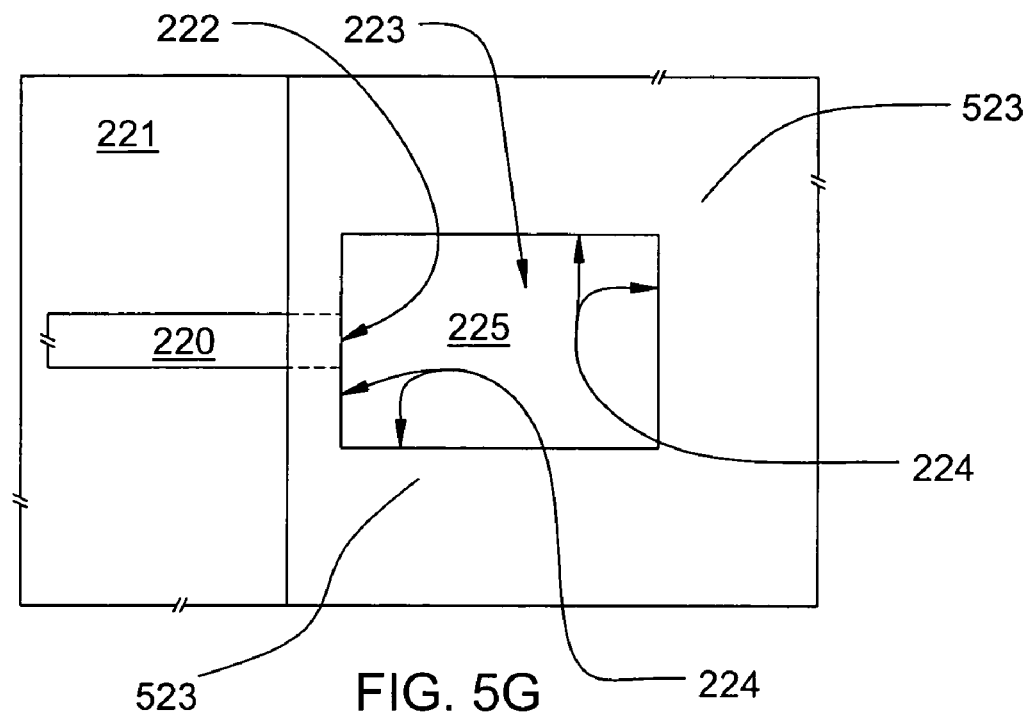
Figure 5H:
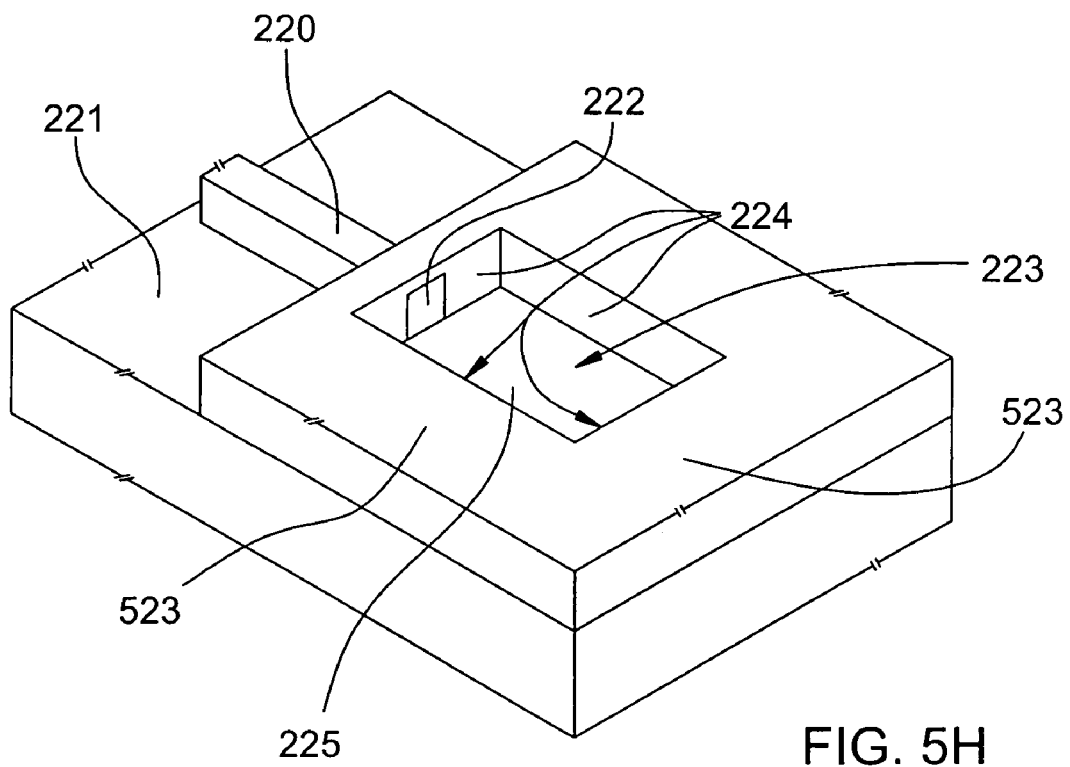
Figure 6A:
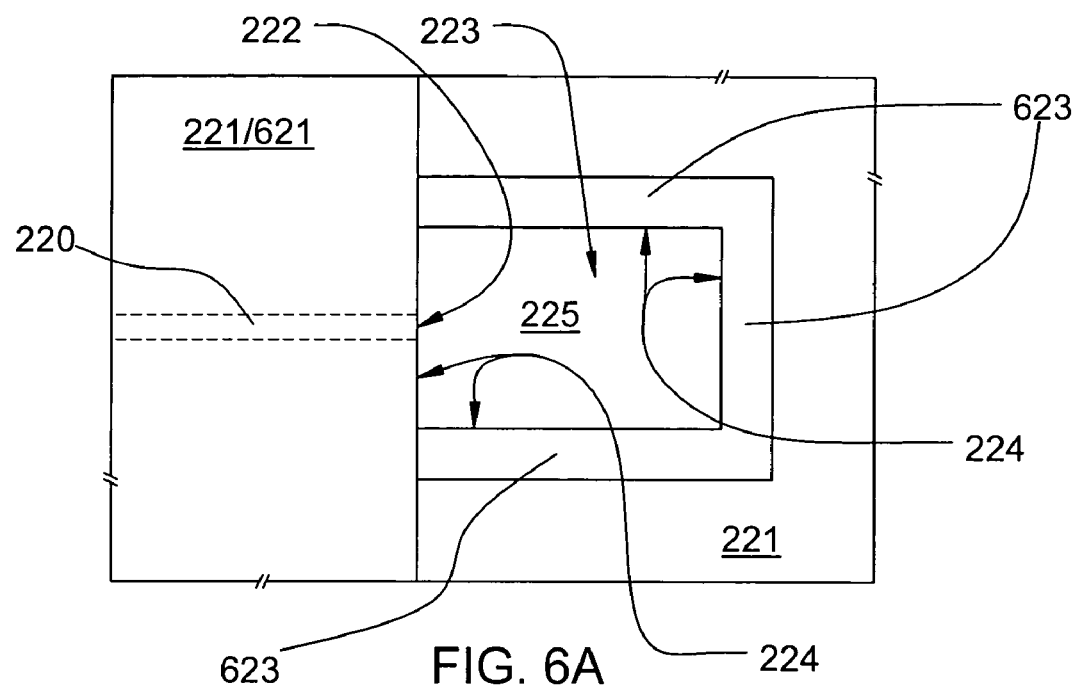
FIGS. 6A–6H are plan and isometric views of a waveguide and detection volume.
Figure 6B:
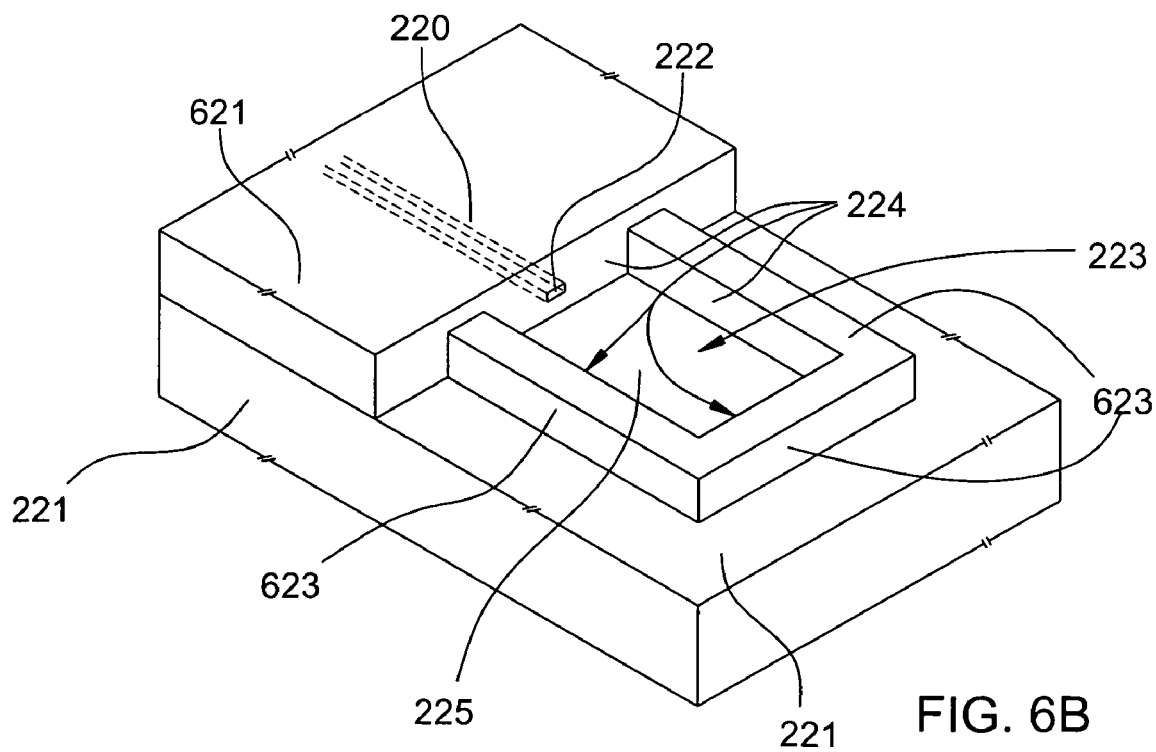
Figure 6C:
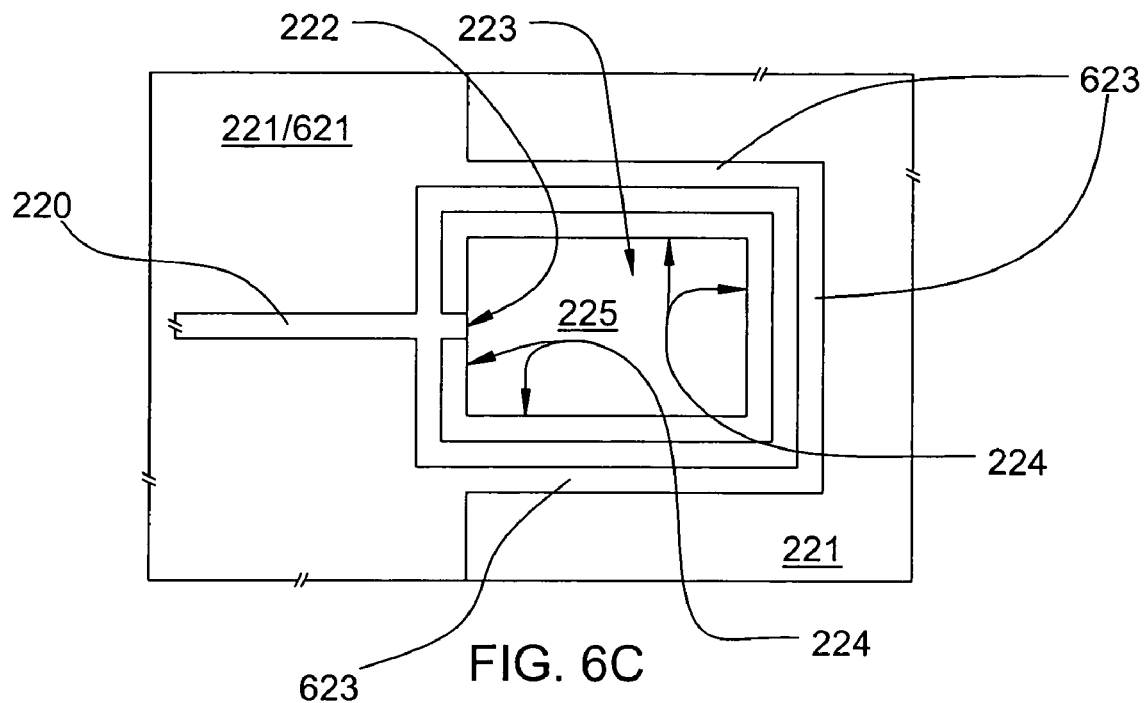
Figure 6D:
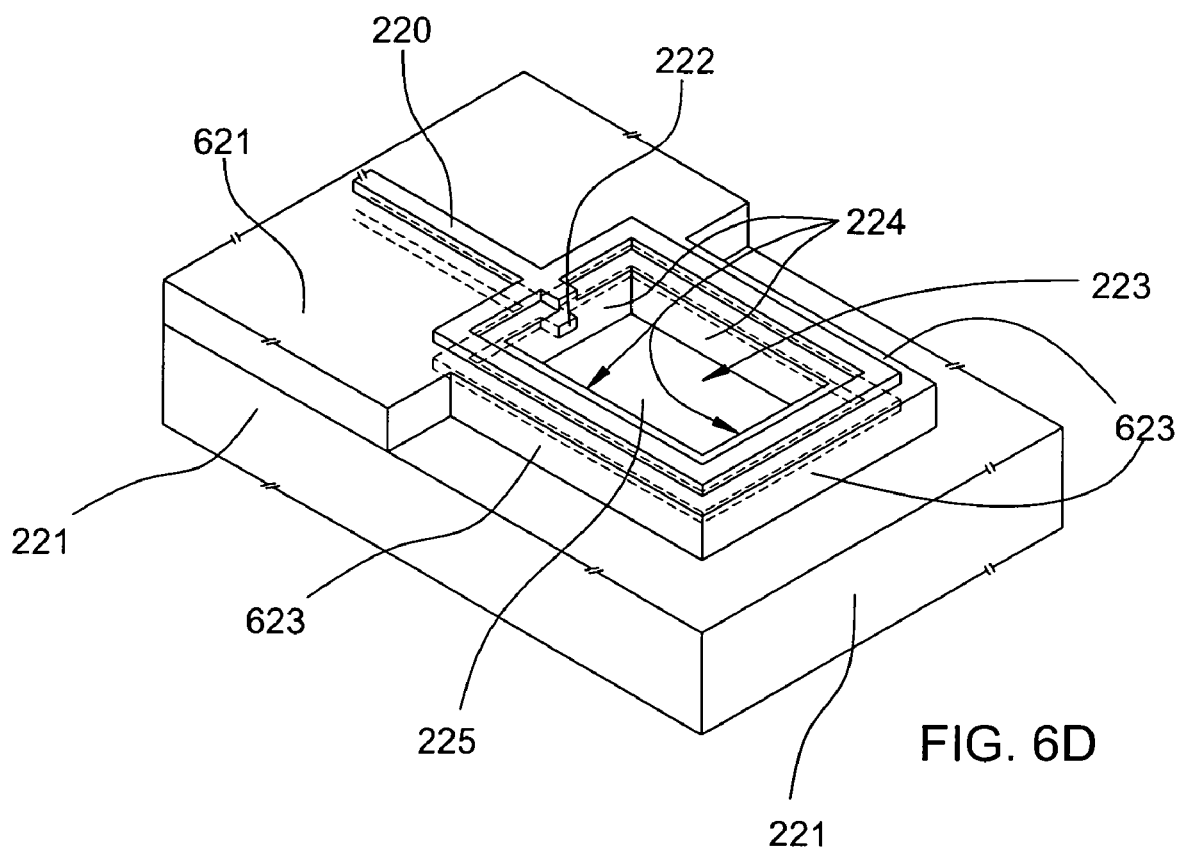
Figure 6E:
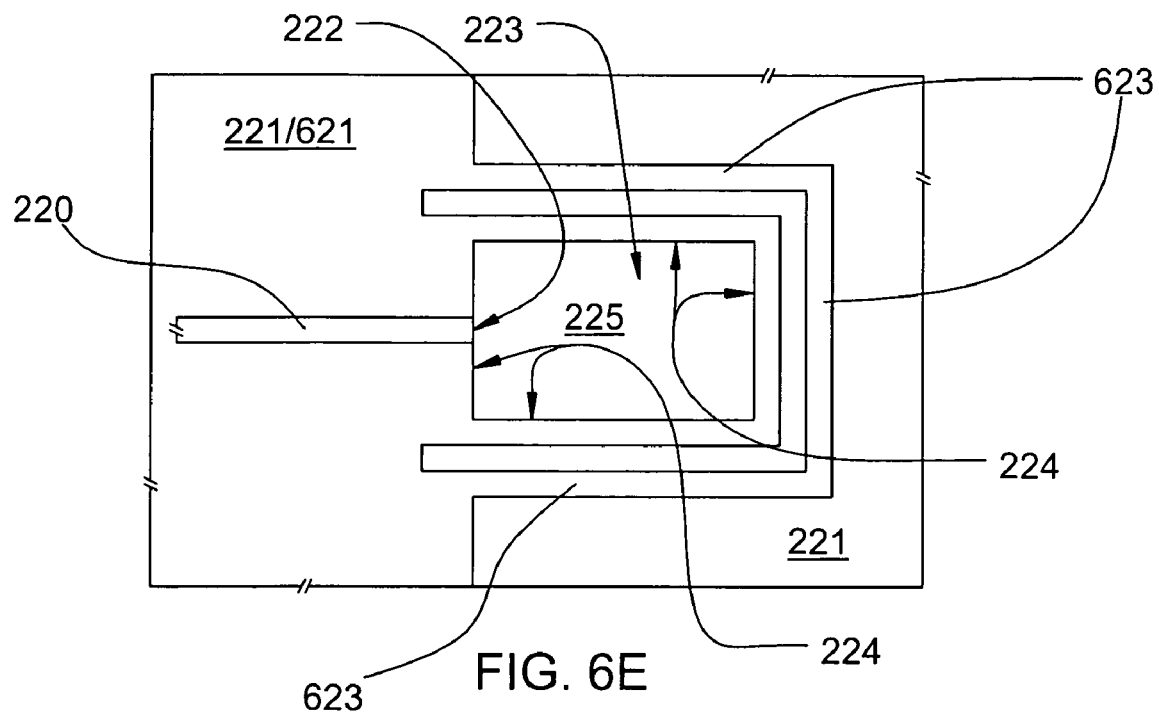
Figure 6F:
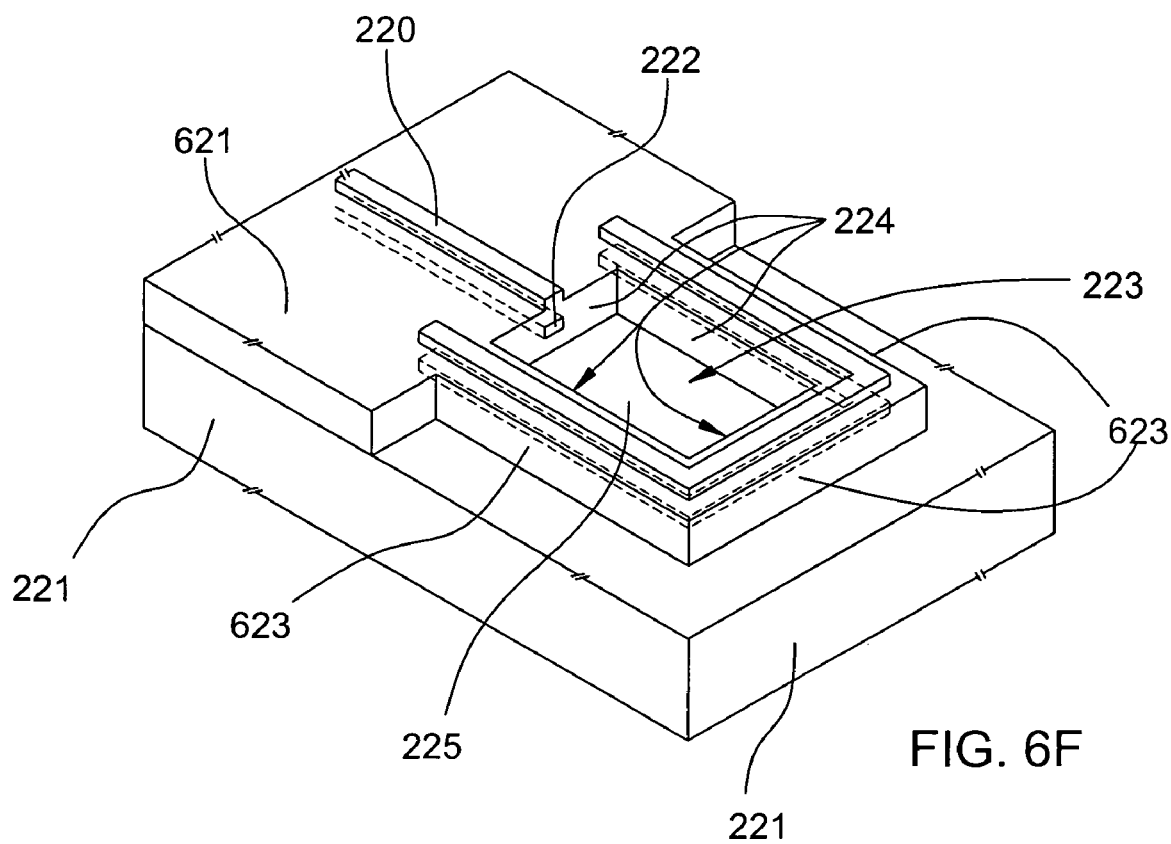
Figure 6G:
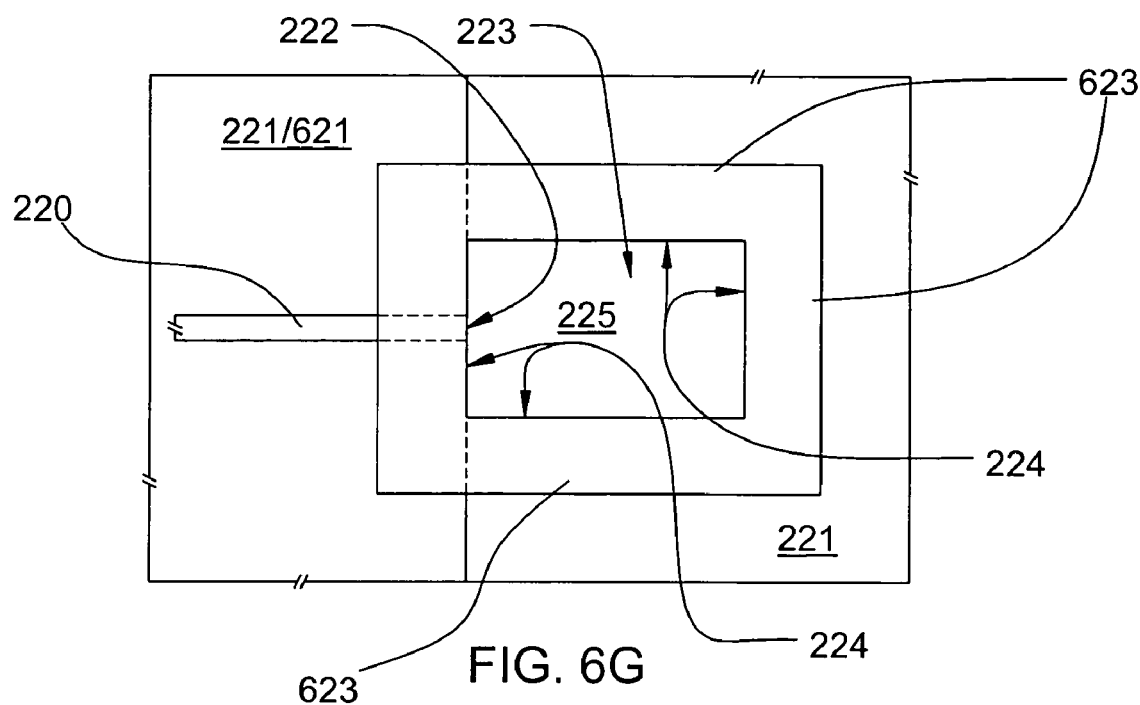
Figure 6H:
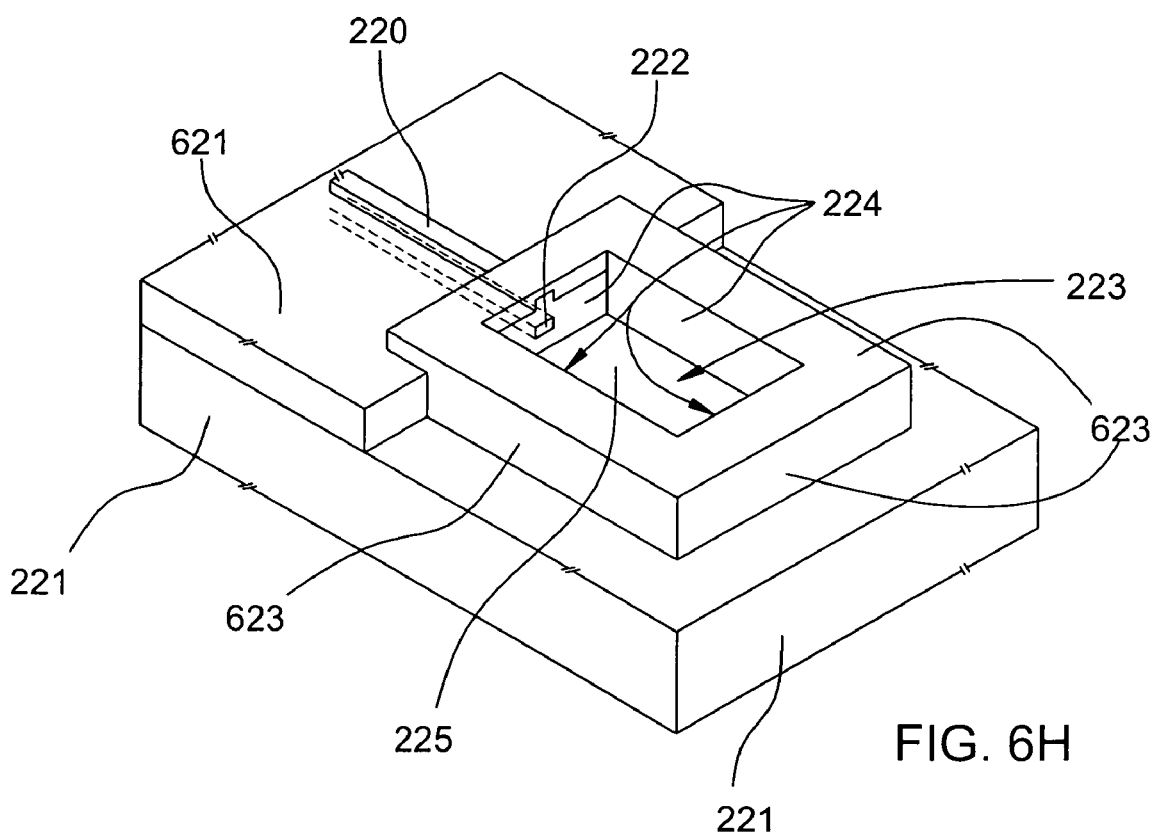
Figure 7A:
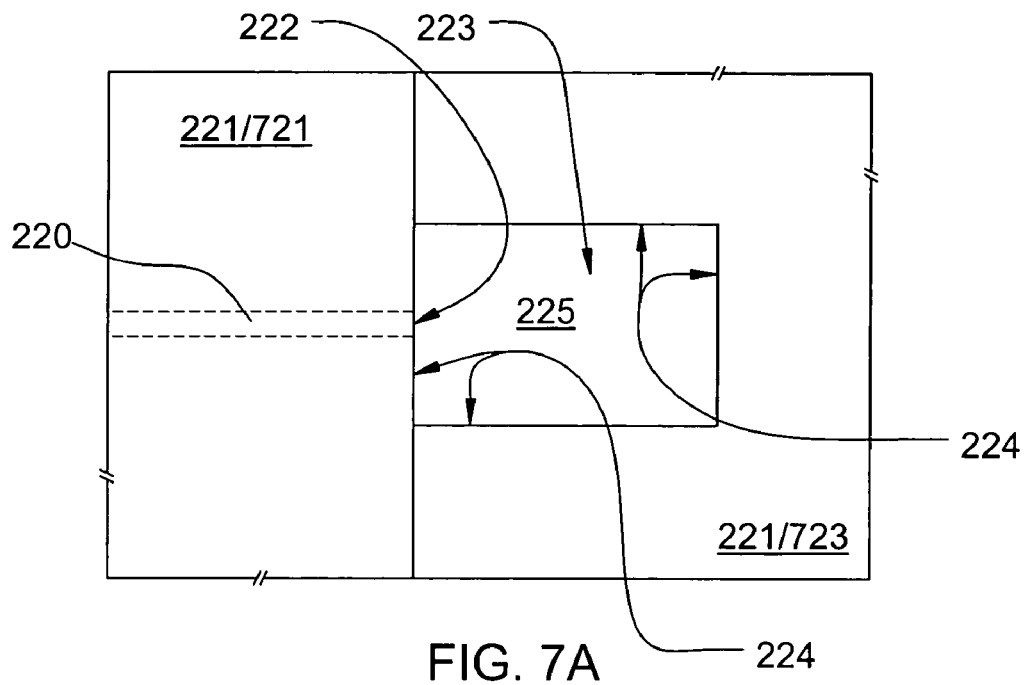
FIGS. 7A–7H are plan and isometric views of a waveguide and detection volume.
Figure 7B:
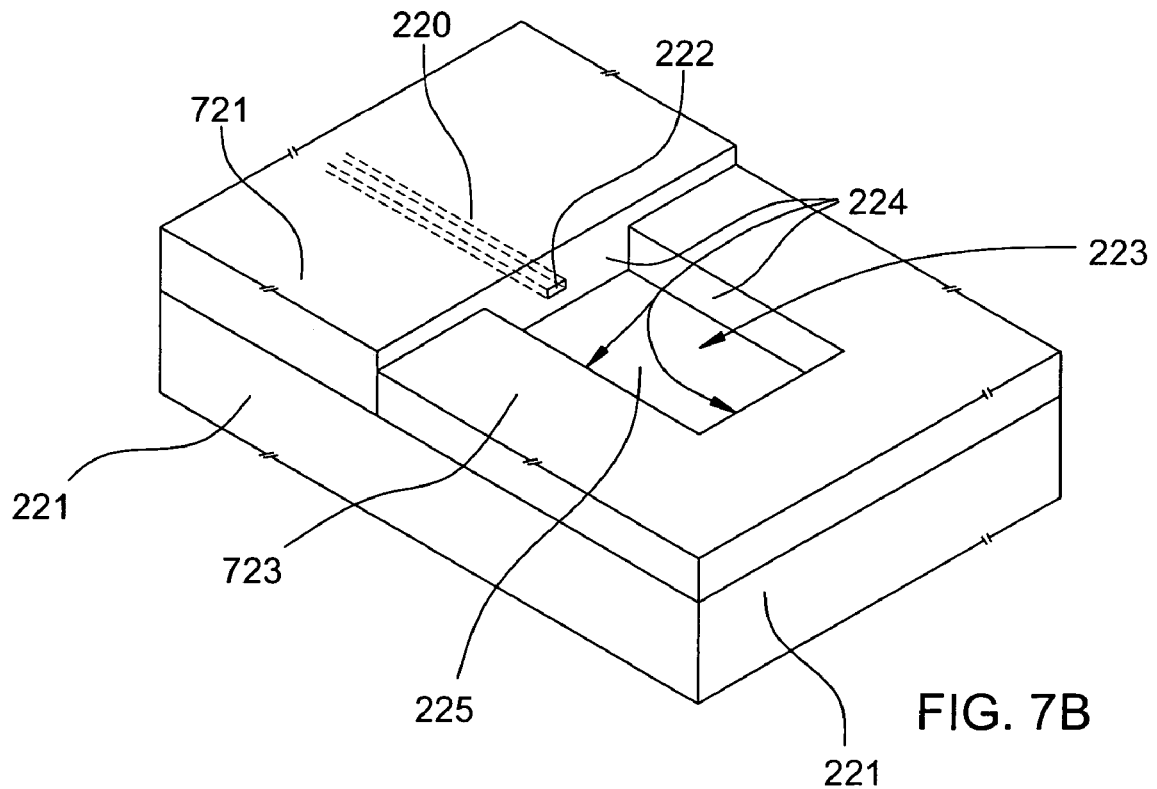
Figure 7C:
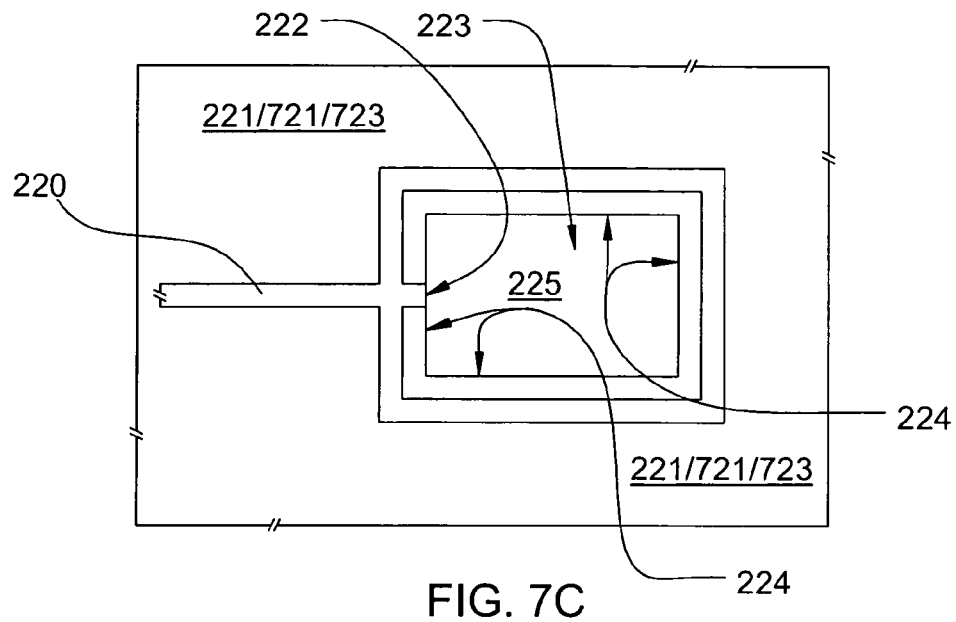
Figure 7D:
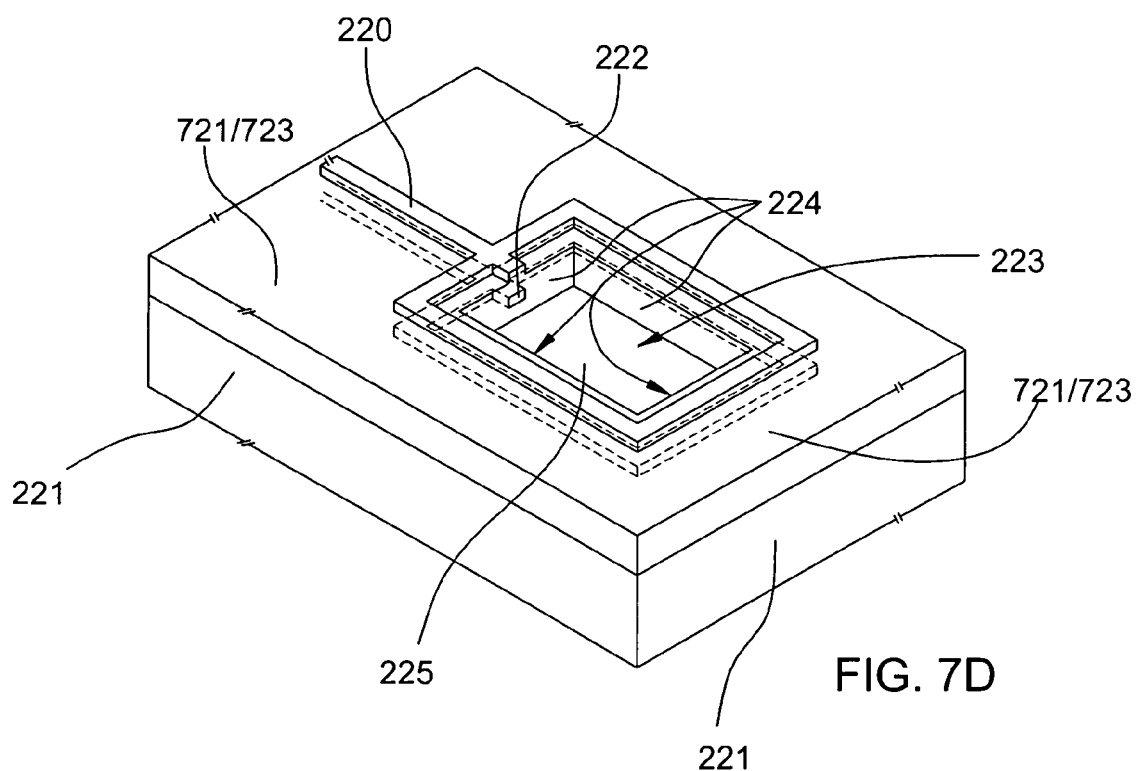
Figure 7E:
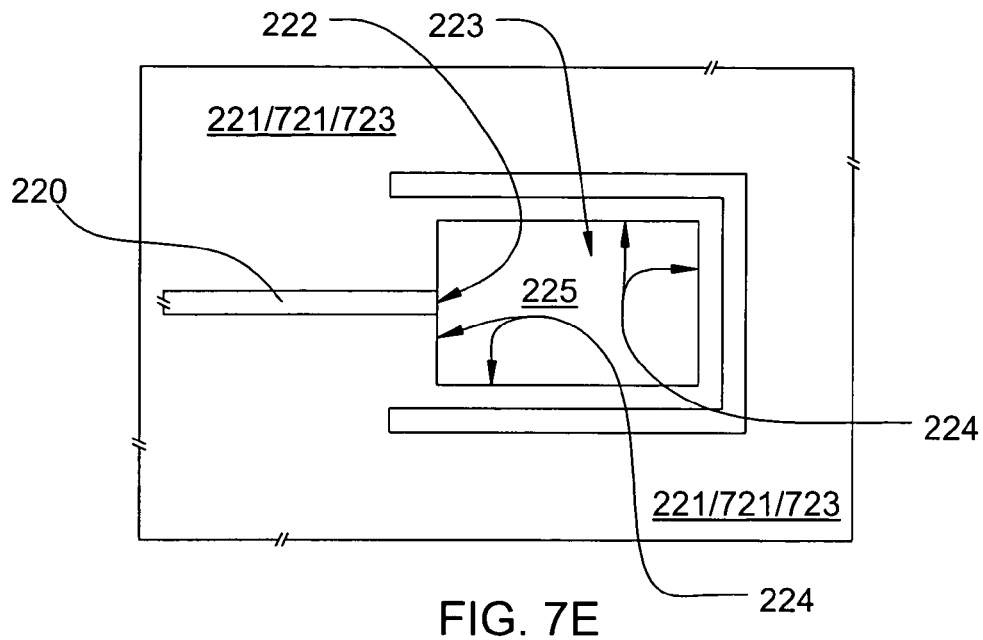
Figure 7F:
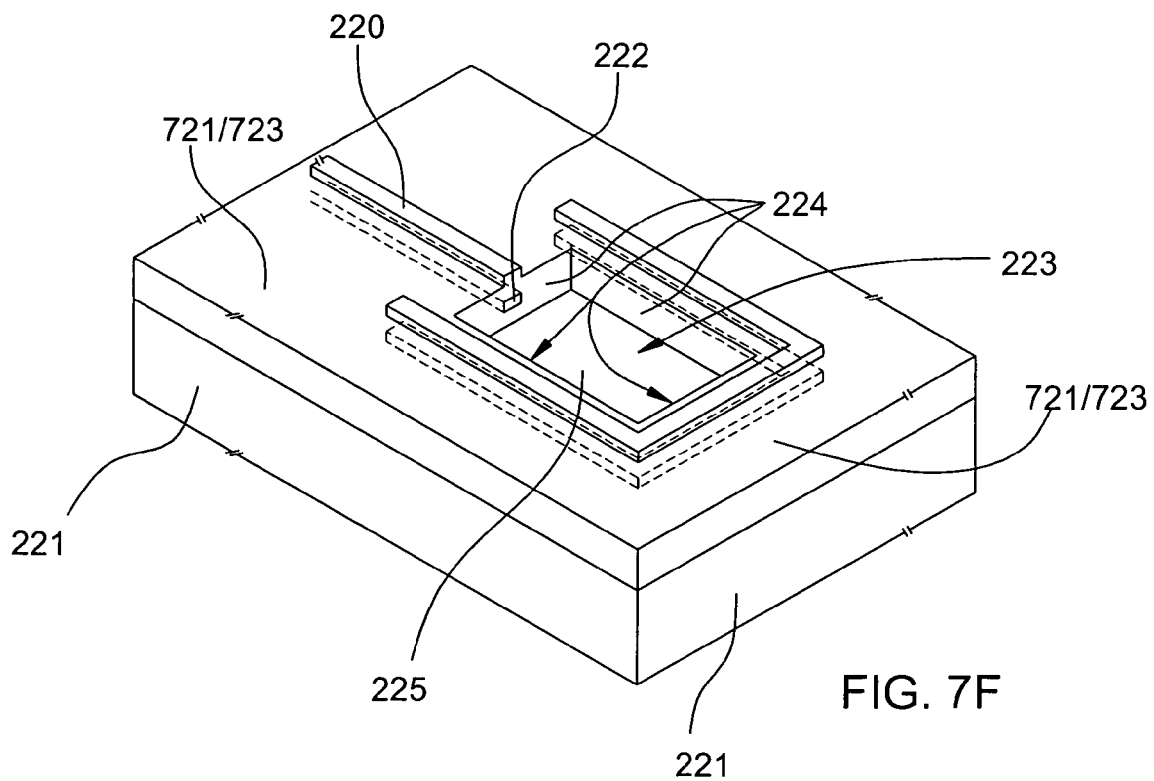
Figure 7G:
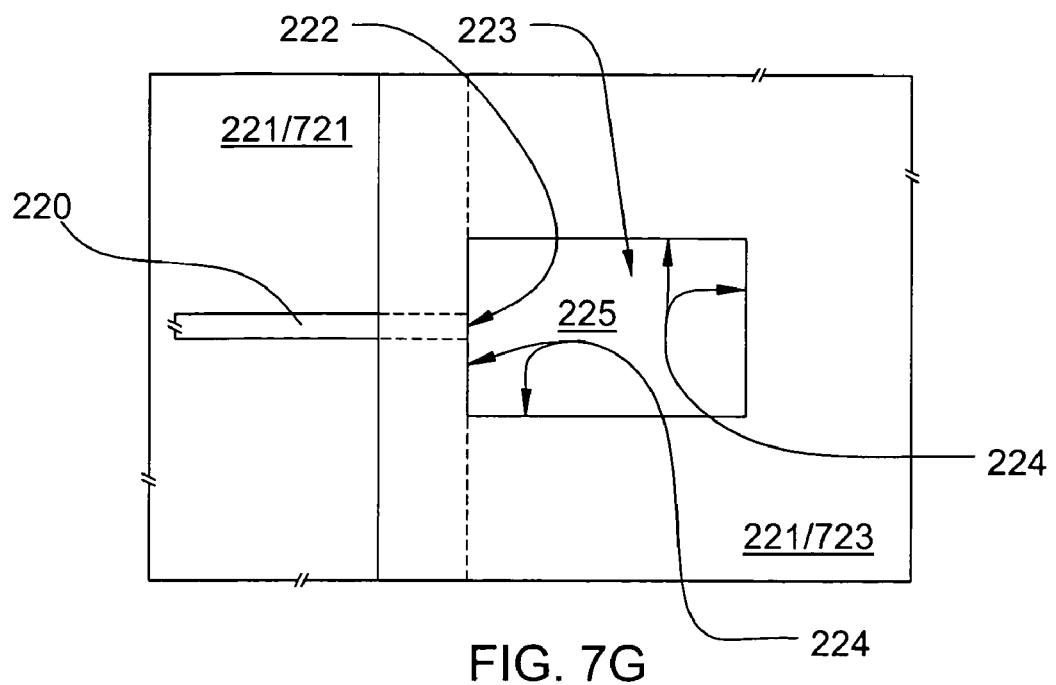
Figure 7H:
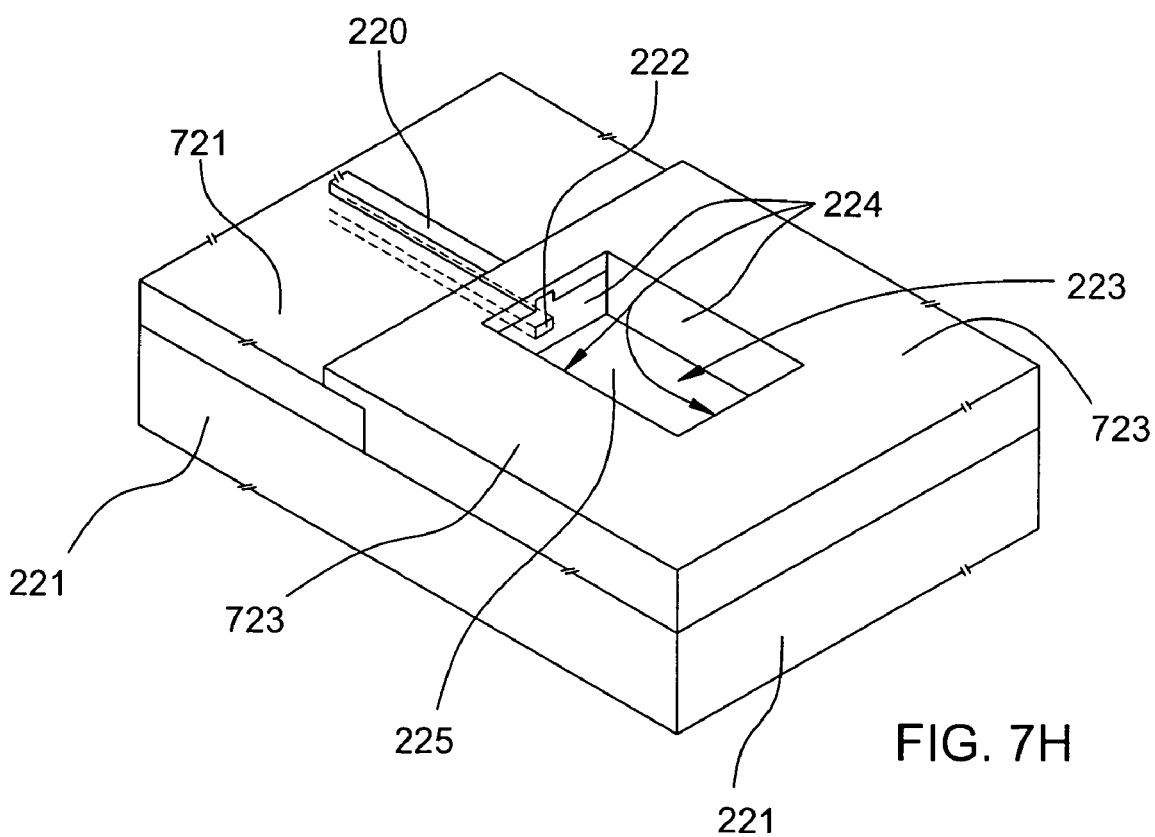

For other exemplary embodiments shown in the Figures, formed with the same or overlapping/compatible material sets, similar considerations may come into play. In FIGS. 5A–5F, the material slab 523 may comprise the same material(s) used to form the cladding of waveguide 220, and may or may not also include core material (over an extended area surrounding the detection volume, or only forming a ring or partial ring around the detection volume as in FIGS. 5C–5F) for providing a substantially flat mounting surface for the photodetector. The mounting surface may be contiguous (FIGS. 5C–5D) or may have gaps (FIGS. 5E–5F). In FIGS. 6A–6F, the optical cladding material(s) forming slab 621 may also be employed for forming ring 623. Ring 623 may or may not also include core material for providing a substantially flat upper mounting surface for the photodetector, either contiguous (FIGS. 6C–6D) or having gaps (FIGS. 6E–6F). In FIGS. 7A–7F, slabs 721 and 723 may comprise a single contiguous slab of optical cladding material(s), and slab 723 may or may not also include core material (over an extended area surrounding the detection volume, or only forming a ring or partial ring around the detection volume as in FIGS. 7A–7F) for providing a substantially flat upper mounting surface for the photodetector, either contiguous (FIGS. 7C–7D) or having gaps (FIGS. 7E–7F). For any of these exemplary embodiments, a substantially flat upper surface may not be necessary for mounting the photodetector, and it may not be necessary to include core material within structures that define the detection volume (FIGS. 5A–5B, 6A–6B, or 7A–7B, without material boundaries between waveguide and detection volume material). If substantially complete enclosure or sealing of the detection volume is needed or desired (for substantially preventing stray light from entering and/or escaping, for substantially preventing foreign matter or embedding material from entering, and/or for other reasons), the use of solder or adhesive may be employed for sealing the photodetector over the detection volume, even if the detection volume lacks a flat mounting surface around its entire perimeter.

In any of these fabrication schemes, reflective coating layer(s) may be applied to all or portions of the bottom surface 225 and/or walls 224 of the detection volume 223 once the detection volume is formed.

Waveguide 220 and detection volume 223 may be formed by separate, successive material processing sequences. This may typically be the case when differing material(s) are employed for forming waveguide 220 and the walls 224 defining detection volume 223, although successive processing sequences may be used even if the same material(s) are employed for both the waveguide and detection volume. Formation of waveguide 220 (and any other waveguides that may also reside on substrate 221) may often require greater precision and accuracy, for achieving optical performance within operationally acceptable limits, than would be required for formation of the detection volume. Therefore, waveguide 220 may often (though not necessarily) be formed first. Once the waveguide is formed, the detection volume may be formed by a subsequent processing sequence, and may result in structures resembling FIGS. 4A–4B, 5A–5B, 6A–6B, or 7A–7B (including material boundaries between waveguide and detection volume materials). Any material(s) compatible with the substrate material, and compatible with materials deposited thereon and/or used to form the waveguide, may be employed for forming the detection volume 223 on the waveguide substrate 221 at the end of the waveguide 220. After formation of the detection volume, reflective coating layer(s) may be applied to all or portions of the bottom surface 225 and/or walls 224 thereof. Use of differing materials and separate spatially selective material processing sequences may facilitate formation of a contiguous flat mounting surface for the photodetector without introducing optical loss due to the presence of core material around the detection volume. Material(s) and/or processing techniques may be employed for forming the detection volume that enable formation of substantially planarized upper surfaces in spite of the presence of non-planar topography beneath (as in FIGS. 4G–4H, 5G–5H, 6G–6H, and 7G–7H). Examples of such materials may include spin-on glass, spin-coated polymers, silicone polymers, polyimide polymers, other polymers, and so forth. Once waveguide 220 is formed with end face 222, a portion of the substrate 221 that encompasses the end of the waveguide may be coated with such a material so as to yield a substantially flat upper surface. Additional spatially selective material processing steps may be employed to remove some of this deposited material to expose the end face 222 of waveguide 220 and form detection volume 223 around the end face, while leaving a substantially flat substantially contiguous mounting surface for the photodetector. Other schemes for forming a detection volume at the end of waveguide 220 may be contrived while remaining within the scope of the present disclosure and/or appended claims.

As stated hereinabove, it may be desirable under some circumstances to completely seal the detection volume 223, by ensuring that the detection volume is completely surrounded by bottom surface 225, walls 224, and waveguide end face 222, and by ensuring that the surface-mounted photodetector 210 completely covers the detection volume and is sealed around the its entire perimeter. Such sealing may be desirable for reducing or substantially preventing light from entering/exiting the detection volume (stray light suppression), or may be desirable for excluding foreign matter and/or embedding material from the detection volume, or may be desirable for other reasons.

Embedding material(s) (equivalently, encapsulants) may often be used to secure and cover optical waveguides, assembled optical components, and/or other optical structures on the waveguide substrate 221. Such embedding media may function as a physical and/or chemical barrier, and may also serve to isolate optically various optical components/structures from the use environment. A typical embedding medium has a refractive index near or somewhat lower than the refractive index of the cladding of waveguide 220 (and other waveguides on the waveguide substrate 221, if any). Such embedding media may serve various optical functions by reducing index contrast between waveguide(s) and surroundings, including but not limited to: reducing leakage from a waveguide; enhancing the adiabatic nature of a transition along a waveguide; reducing reflections at a waveguide end face; reducing divergence of a free-space optical mode end-coupled to a waveguide optical mode at a waveguide end face. It is usually desirable that such an embedding medium either substantially completely fill a particular volume or substantially completely cover a particular surface, or alternatively is substantially completely absent from such a volume or surface. Incomplete or partial filling/covering may give rise to optical scattering, and typically adversely affects the overall function of optical components/structures on the waveguide substrate. Therefore, for optimal performance the detection volume 223 should either be substantially filled with embedding material, or substantially devoid of embedding material. Forming detection volume 223 so as to be completely surrounded and sealed by inner face 224, waveguide end face 222, and photodetector 210 (as described hereinabove) ensures that any embedding material applied to the waveguide substrate 221 after surface-mounting and sealing of the photodetector 210 is substantially excluded from the detection volume 223.

Figure 11A:
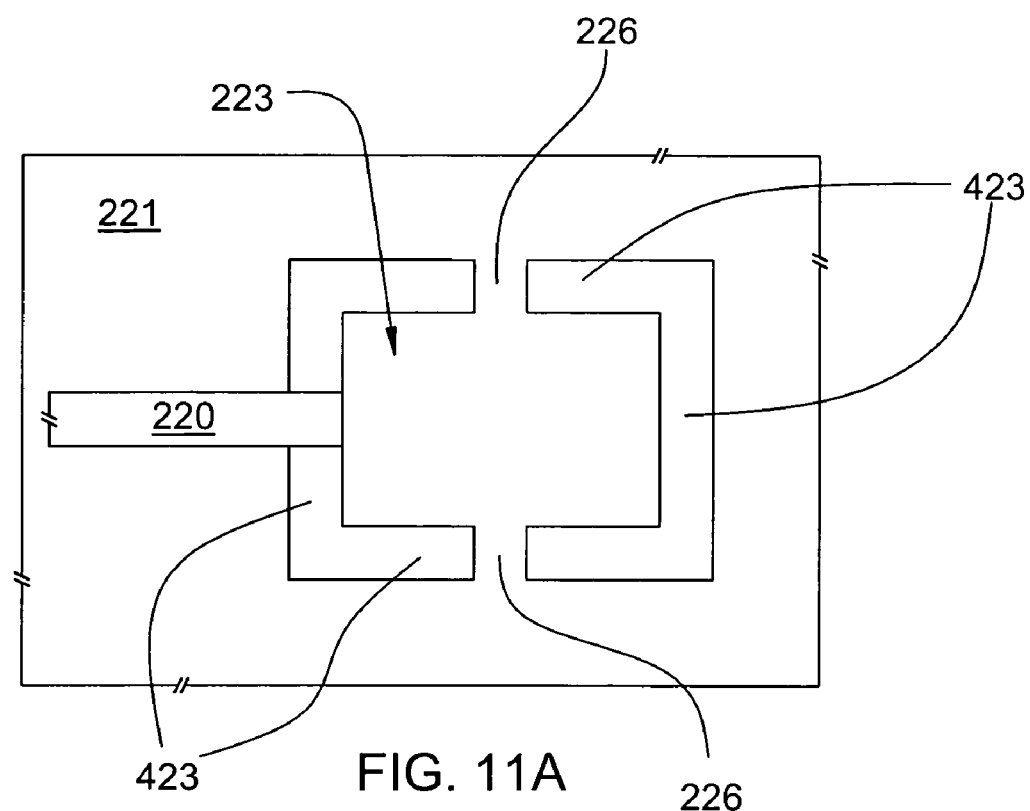
FIGS. 11A–11B are plan views of an optical waveguide and detection volume.
Figure 11B:
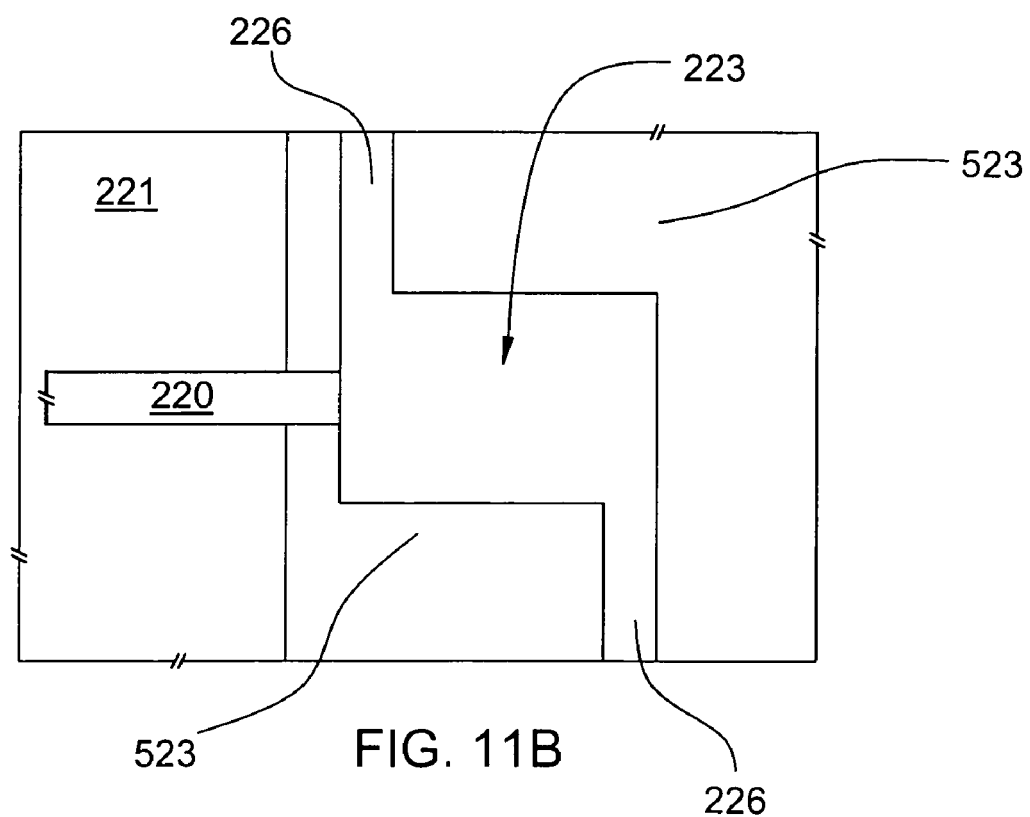

Embedding material present at waveguide end face 222 would serve to decrease the divergence of light emerging from the waveguide 220, reducing the fraction of the light reaching the photodetector active area and/or requiring use of an enlarged detection volume and correspondingly enlarged photodetector. If such conditions are not operationally acceptable, then the detection volume and photodetector should be adapted as described hereinabove for substantially excluding embedding material from the detection volume. On the other hand, if conditions imposed by the presence of embedding material within the detection volume are within operationally acceptable limits, it may be advantageous to eliminate the requirement for sealing the detection volume, and to allow the detection volume to fill with embedding material. Surface-mounting of the photodetector is typically performed before application of embedding material. Incomplete or partial filling is typically detrimental, so the detection volume 223 may be adapted to ensure substantially complete filling with embedding material. As shown in FIGS. 11A–11B, channels 226 are provided for allowing flow of liquid embedding material precursor(s) into the detection volume (and trapped air to escape) with the photodetector already mounted. The channels may or may not be the same depth as the detection volume itself. The channels may be formed during the same material processing sequence used to form the detection volume, of may be formed in a separate material processing sequence. Such channels may be provided for any of the exemplary optomechanical configurations disclosed herein, and for equivalents thereof. Alternatively, embedding material may be excluded from the detection volume by formation of a wall or "dam" surrounding the detection volume, sufficiently high so as to substantially prevent flow of embedding material into the detection volume even if it is not sealed.

Figure 12A:
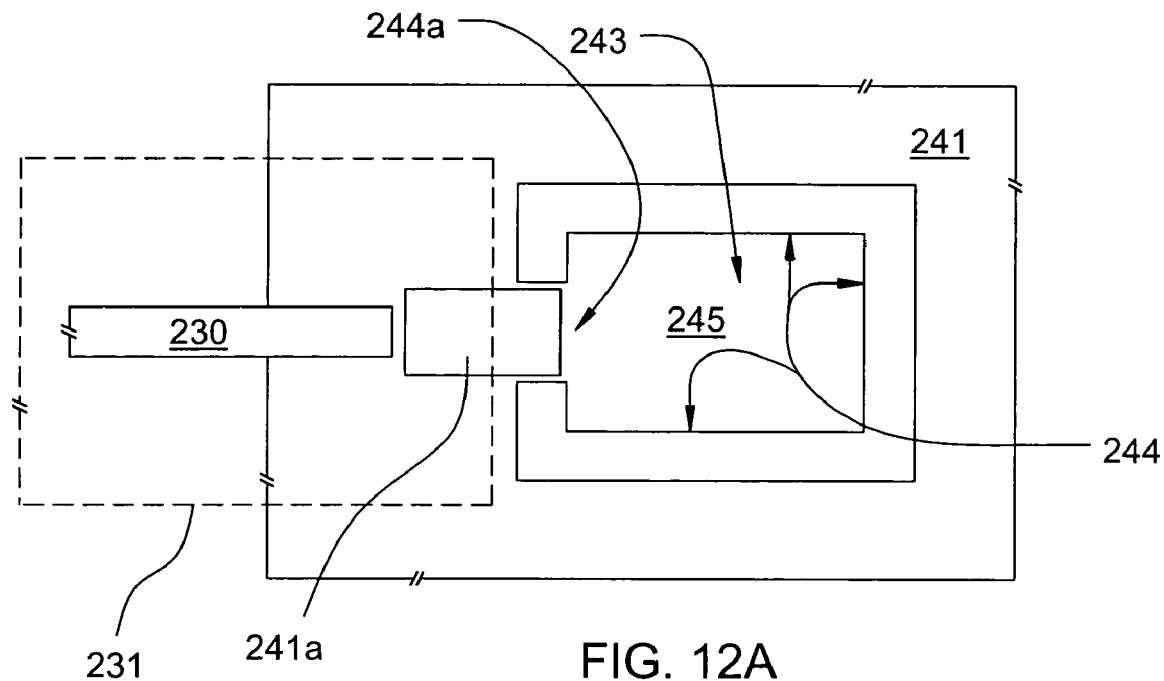
FIGS. 12A–12B are plan and side views of a waveguide, detection volume, and photodetector.
Figure 12B:
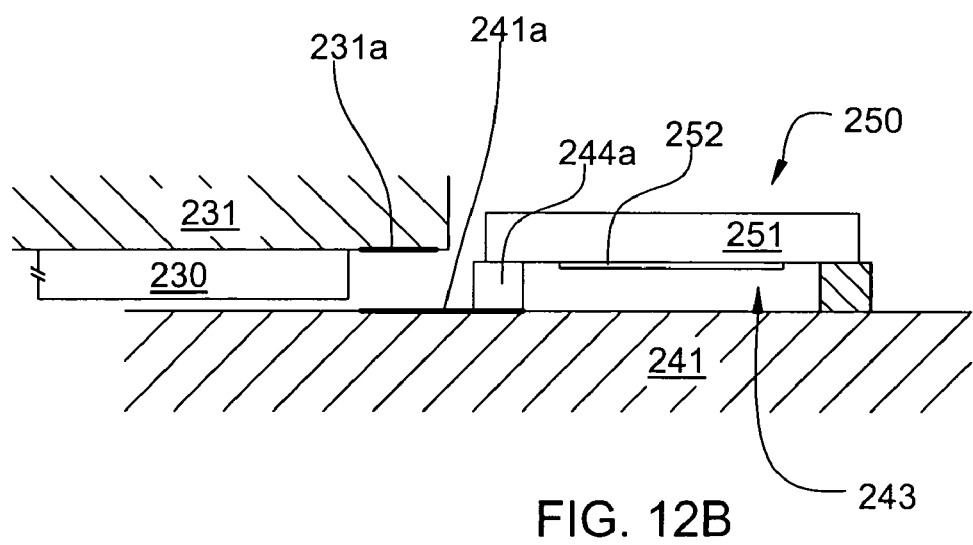

Exemplary embodiments shown thus far have included a waveguide and walls (defining a detection volume) formed on a common waveguide substrate. Other exemplary embodiments falling within the scope of the present disclosure may include a waveguide 230 on a first substrate 231 and a detection volume 243 defined by walls 244 formed on a second substrate 241 (FIGS. 12A–12B). A gap 244a must be provided through one of the walls 244 of the detection volume to admit light (typically a physical gap; alternatively a substantially transparent "window" through wall 244). A photodetector 250 (including an active area 252 formed on a detector substrate 251) is assembled onto substrate 241 and covers at least a portion of the detection volume 243. Upon assembly of substrate 231 and 241 (typically employing so-called "flip-chip" mounting; alignment/support structures not shown), the detection volume 243 is positioned near the end face of waveguide 230, so that light emerging from waveguide 230 through the end face may enter the detection volume 243 through gap 244a. Suitable reflective coating layer(s) may be applied to all or portions of the interior of the detection volume 243 (bottom surface 245 and walls 244), and it may be advantageous to apply suitable reflective coating layer(s) to an area 231a of substrate 231 adjacent the waveguide end face. It may also be advantageous to apply suitable reflective coating layer(s) to an area 241a within and just outside gap 244a, near the waveguide end face upon assembly. In this way, light emerging from waveguide 230 that diverges toward substrate 231 may be reflected from area 231a into the detection volume, while light diverging away from substrate 231 may enter the detection volume upon reflection from area 241a. Once light enters the detection volume (through gap 244a), it may reach the photodetector directly, or after one or more reflections from interior surfaces of the detection volume (bottom surface 245 and/or walls 244). Substrate area 231a may be altered so as to provide a tilted reflective surface for directing a larger fraction of emergent light into the detection volume and onto the photodetector 250. Area 241a may be similarly altered to provide a tilted reflective surface.

The arrangement of FIGS. 12A–12B may be well-suited for providing a monitor photodetector for a semiconductor laser. As shown in FIGS. 14A–14D, a semiconductor laser 270 is positioned so that at least a portion of light emerging from its back end face (i.e., back facet) enters detection volume 243 for detection by photodetector 252. The output of semiconductor laser 270 would typically emerge from the other end face. Semiconductor laser 270 may be formed or mounted on substrate 241 along with the walls 244, as in FIGS. 14A and 14B, or may be formed on a separate laser substrate 271 and mounted on substrate 241, as in FIGS. 14C and 14D (support and/or alignment structures not shown). An optical waveguide 260 may be positioned for receiving at least a portion of the laser output emerging from the output end face of laser 270. Any type of waveguide, including a planar waveguide or an optical fiber, may be employed for this purpose. The exemplary embodiments of FIGS. 14C–14D include a planar waveguide 260 formed on substrate 241 along with the walls 244, while the exemplary embodiments of FIGS. 14A–14B include a waveguide 260 mounted on substrate 241 (a planar waveguide 260 formed on a waveguide substrate 261 and mounted on substrate 241 in FIG. 14A; and optical fiber 260 mounted on substrate 241 in FIG. 14B). In FIGS. 14A–14C, the output of laser 270 enters waveguide 260 through an end face thereof (i.e., via optical end-coupling). In FIG. 14D, an external-transfer waveguide 272 is formed on laser substrate 271 along with semiconductor laser 270, and the output of laser 270 enters waveguide 260 via optical transverse-coupling between waveguides 260 and 272. Other arrangements which include a detection volume positioned for receiving a portion of the laser output shall also fall within the scope of the present disclosure and/or appended claims.

Figure 13A:
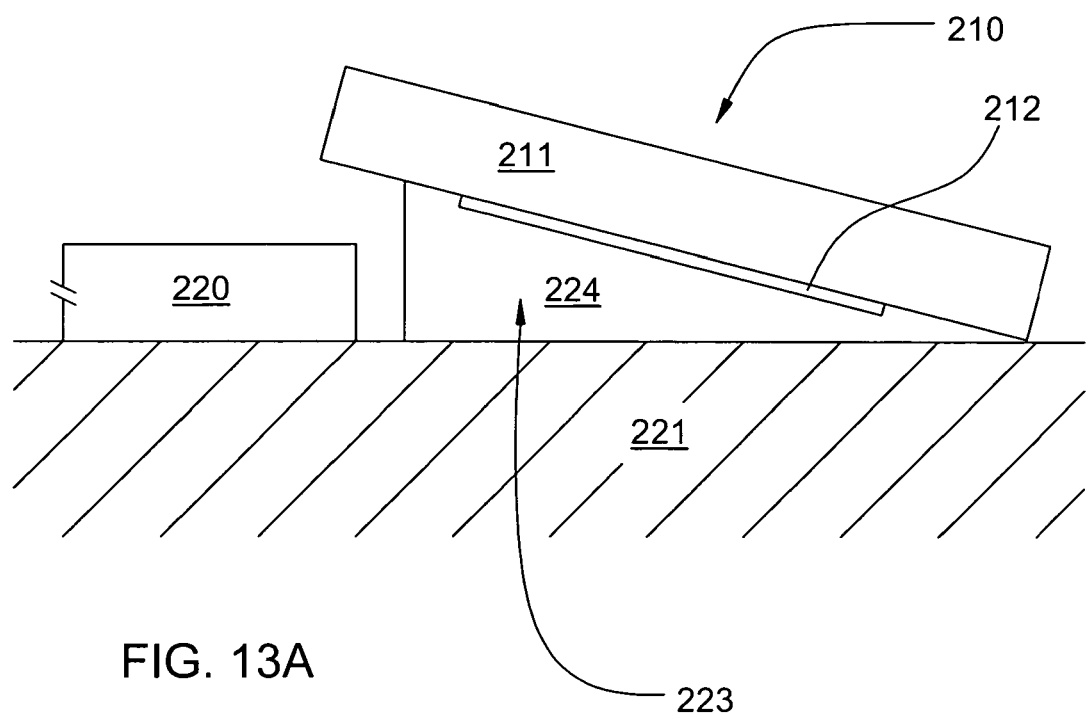
FIGS. 13A–13B are side views of a waveguide, detection volume, and photodetector.
Figure 13B:
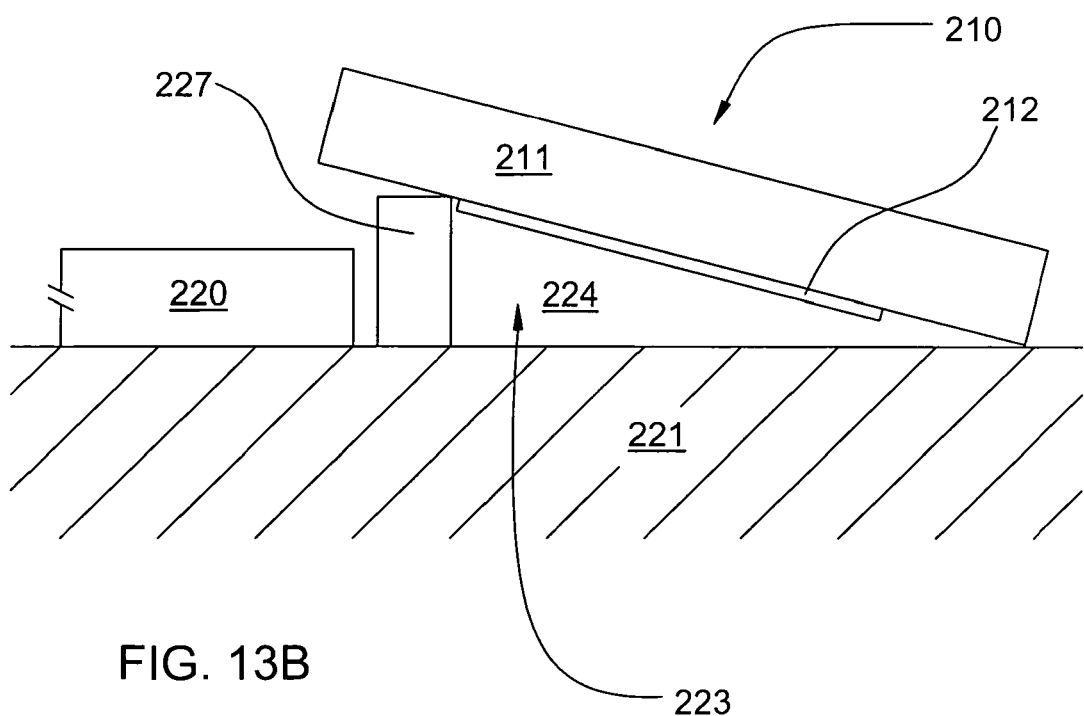

In another exemplary embodiment, the photodetector 210 may be mounted in a tilted orientation relative to substrate 221, thereby eliminating the need for a wall 224 opposite end face 222 (FIGS. 13A–13B). Side walls 224 of the detection volume 223 may be sloped to facilitate such tilted mounting (FIG. 13A). Alternatively, mounting support structure(s) 227 may be employed for supporting a front edge of a tilted photodetector 210 (FIG. 13B), with solder or adhesive forming side walls 224. Bottom surface 225 may be provided with reflective coating(s) as described hereinabove.

While in the exemplary embodiments the detection volume is shown as a rectangular space, this need not be the case. The detection volume may assume any suitable shape (rectangular, square, polygonal, circular, oval, and so on) while remaining within the scope of the present disclosure and/or appended claims.

For purposes of the foregoing written description and/or the appended claims, "index" may denote the bulk refractive index of a particular material (also referred to herein as a "material index") or may denote an "effective index" $n_{eff}$, related to the propagation constant $\beta$ of a particular optical mode in a particular optical element by $\beta=2\pi n_{eff}/\lambda$. The effective index may also be referred to herein as a "modal index". As referred to herein, the term "low-index" shall denote any materials and/or optical structures having an index less than about 2.5, while "high-index" shall denote any materials and/or structures having an index greater than about 2.5. Within these bounds, "low-index" may refer to: silica ($SiO_x$), germano-silicate, boro-silicate, other doped silicas, and/or other silica-based materials; silicon nitride ($Si_xN_y$) and/or silicon oxynitrides ($SiO_xN_y$); other glasses; other oxides; various polymers; and/or any other suitable optical materials having indices below about 2.5. "Low-index" may also include optical fiber, optical waveguides, planar optical waveguides, and/or any other optical components incorporating such materials and/or exhibiting a modal index below about 2.5. Similarly, "high-index" may refer to materials such as semiconductors, IR materials, and/or any other suitable optical materials having indices greater than about 2.5, and/or optical waveguides of any suitable type incorporating such material and/or exhibiting a modal index greater than about 2.5. The terms "low-index" and "high-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two particular materials has the larger index, regardless of the absolute numerical values of the indices.

The term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. Patent Application Pub. No. 2003/0081902 and/or U.S. provisional App. No. 60/466, 799) for mounting one or more optical sources, lasers, modulators, photodetectors, and/or other optical devices adapted for transverse-transfer of optical power with a suitably adapted PLC waveguide (mode-interference-coupled, or substantially adiabatic, transverse-transfer; also referred to as transverse-coupling).

For purposes of the present written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" a layer or structure may involve either or both of: spatially-selective deposition and/or growth, or substantially uniform deposition and/or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers described herein as "secured to", "connected to", "mounted on", "deposited on", "formed on", "positioned on", etc., a substrate may make direct contact with the substrate material, or may make contact with one or more layer(s) and/or other intermediate structure(s) already present on the substrate, and may therefore be indirectly "secured to", etc, the substrate.

The term "optical device" or "semiconductor optical device" as used herein may denote a device providing optical functionality (passive and/or active) wherein at least a portion of the device comprises suitably configured semiconductor material(s). The terms "device", "optical device", and/or "semiconductor optical device" as used herein may denote only the semiconductor portion of an optical device, or may denote an overall optical device structure or assembly of which only a portion comprises semiconductor material(s) (and which may include an integrated end-coupled waveguide as described further hereinbelow). Which of these is intended is typically evident from the context in which the term appears. The term "semiconductor laser" as used herein may denote a semiconductor optical device adapted for providing optical gain upon electrical pumping (i.e., a laser gain medium), or may alternatively refer to an optical resonator (supporting longitudinal optical modes) with such a semiconductor optical gain medium included therein. Which of these is intended is typically evident from the context in which the term appears.

The phrase "operationally acceptable" appears herein describing levels of various performance parameters of optical components and/or optical devices, such as optical power transfer efficiency (equivalently, optical coupling efficiency), optical loss, undesirable optical mode coupling, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, lower optical detection efficiency may be an acceptable trade-off for achieving lower device fabrication cost in some instances, while higher optical detection efficiency may be required in other instances in spite of higher fabrication costs. The "operationally acceptable" optical detection efficiency therefore varies between the instances. In another example, a lower optical coupling efficiency may be an acceptable trade-off for achieving lower device fabrication costs in some instances, while higher optical coupling may be required in other instances in spite of higher fabrication costs. The "operationally acceptable" coupling efficiency therefore varies between the instances. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "substantially modal-index-matched", "so as to substantially avoid undesirable optical coupling", and so on as used herein shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus, comprising:
    a bottom surface and walls formed on a first substrate and substantially defining a detection volume and an upper opening thereof;
    an optical waveguide having an end face, the optical waveguide aligned substantially parallel to the first substrate and positioned so that at least a portion of light emerging from the end face enters the detection volume; and
    a photodetector having an active area on a detector substrate, the detector substrate mounted on the first substrate so as to cover at least a portion of the upper opening of the detection volume with at least a portion of the active area exposed to the detection volume,
    wherein:
    the optical waveguide is formed on a waveguide substrate;
    the optical waveguide is mounted on the first substrate; and
    light emerging from the end face of the optical waveguide may enter the detection volume through a substantially transparent segment of one of the walls thereof.

2. An optical apparatus, comprising:
    a bottom surface and walls formed on a first substrate and substantially defining a detection volume and an upper opening thereof;
    an optical waveguide having an end face, the optical waveguide aligned substantially parallel to the first substrate and positioned so that at least a portion of light emerging from the end face enters the detection volume;
    a photodetector having an active area on a detector substrate, the detector substrate mounted on the first substrate so as to cover at least a portion of the upper opening of the detection volume with at least a portion of the active area exposed to the detection volume; and a reflective coating on a least a portion of the bottom surface of the detection volume, wherein the reflective coating comprises a metallic coating, and the metallic reflective coating serves as an electrical contact for the active area of the detector substrate.

3. A method, comprising:

forming a bottom surface and walls on a first substrate, thereby substantially defining a detection volume and an upper opening thereof;

forming an optical waveguide on a waveguide substrate;

mounting the optical waveguide on the first substrate;

positioning the optical waveguide substantially parallel to the first substrate so that at least a portion of light emerging from an end face of the optical waveguide enters the detection volume;

mounting a detector substrate on the first substrate so as to cover at least a portion of the upper opening of the detection volume with at least a portion of an active area on the detector substrate exposed to the detection volume; and forming a substantially transparent segment of one of the walls of the detection volume for admitting into the detection volume at least a portion of the light emerging from the end face of the optical waveguide.

4. A method, comprising:

forming a bottom surface and walls on a first substrate, thereby substantially defining a detection volume and an upper opening thereof;

forming a reflective coating on at least a portion of the bottom surface of the detection volume;

positioning an optical waveguide substantially parallel to the first substrate so that at least a portion of light emerging from an end face of the optical waveguide enters the detection volume; and mounting a detector substrate on the first substrate so as to cover at least a portion of the upper opening of the detection volume with at least a portion of an active area on the detector substrate exposed to the detection volume, wherein the reflective coating comprises a metallic coating, and the metallic reflective coating serves as an electrical contact for the active area of the detector substrate.

5. An optical apparatus, comprising:

a bottom surface and walls formed on a first substrate and substantially defining a detection volume and an upper opening thereof;

a semiconductor laser having a first laser end face and a second laser end face, the semiconductor laser aligned substantially parallel to the first substrate and positioned so that at least a portion of light emerging from the first laser end face enters the detection volume; and a photodetector having an active area on a detector substrate, the detector substrate mounted on the first substrate so as to cover at least a portion of the upper opening of the detection volume with at least a portion of the active area exposed to the detection volume.

6. The apparatus of claim 5, further comprising an optical waveguide positioned so that at least a portion of light emerging from the second laser end face enters the optical waveguide.

7. The apparatus of claim 6, wherein the optical waveguide comprises a planar optical waveguide formed on the first substrate.

8. The apparatus of claim 6, wherein the optical waveguide is mounted on the first substrate.

9. The apparatus of claim 6, wherein at least a portion of the light emerging from the second laser end face enters the optical waveguide through an end face thereof.

10. The apparatus of claim 6, wherein at least a portion of the light emerging from the second laser end face enters the optical waveguide by transverse-coupling thereto.

11. The apparatus of claim 5, wherein the semiconductor laser is formed on the first substrate.

12. The apparatus of claim 5, wherein the semiconductor laser is formed on a laser substrate and mounted on the first substrate.

* * * * *

UNITED STATES PATENT AND TRADEMARK OFFICE
CERTIFICATE OF CORRECTION

PATENT NO. : 7,095,928 B2 Page 1 of 1
APPLICATION NO. : 10/721631
DATED : August 22, 2006
INVENTOR(S) : Blauvelt et al.

It is certified that error appears in the above-identified patent and that said Letters Patent is hereby corrected as shown below:

On the Title Page

Item
(56) References Cited                          Delete "Banzoni",
U.S. Patent Documents, pg. 2, Column 1         Insert --Benzoni--
2004/0052480 A1...

Item
(56) References Cited                          Delete "1.3-um GaInAsP/InO",
Other Publications, pg. 2, Column 2            Insert --1.3µm GaInAsP/InP--
Bouadma et al., 1.3...

In the Claims

Column 15, line 4, Claim 2                     Delete "a least",
                                               Insert --at least--

Signed and Sealed this

Twenty-seventh Day of March, 2007

JON W. DUDAS
*Director of the United States Patent and Trademark Office*